(12) United States Patent
Li et al.

(10) Patent No.: US 12,081,751 B2
(45) Date of Patent: Sep. 3, 2024

(54) GEOMETRY PARTITION MODE AND MERGE MODE WITH MOTION VECTOR DIFFERENCE SIGNALING

(71) Applicant: Tencent America LLC, Palo Alto, CA (US)

(72) Inventors: Guichun Li, San Jose, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/723,302

(22) Filed: Apr. 18, 2022

(65) Prior Publication Data
US 2022/0353500 A1  Nov. 3, 2022

Related U.S. Application Data

(60) Provisional application No. 63/179,912, filed on Apr. 26, 2021.

(51) Int. Cl.
*H04N 19/119* (2014.01)
*H04N 19/137* (2014.01)
*H04N 19/159* (2014.01)
*H04N 19/169* (2014.01)
*H04N 19/176* (2014.01)
*H04N 19/70* (2014.01)

(52) U.S. Cl.
CPC ......... *H04N 19/119* (2014.11); *H04N 19/137* (2014.11); *H04N 19/159* (2014.11); *H04N 19/176* (2014.11); *H04N 19/1887* (2014.11); *H04N 19/70* (2014.11)

(58) Field of Classification Search
None
See application file for complete search history.

(56) References Cited

U.S. PATENT DOCUMENTS

| 2020/0404267 | A1  | 12/2020 | Liao et al. | |
| 2021/0058617 | A1* | 2/2021  | Reuze | H04N 19/537 |
| 2023/0051108 | A1* | 2/2023  | Zhang | H04N 19/176 |

FOREIGN PATENT DOCUMENTS

WO   2020/180159 A1   9/2020

OTHER PUBLICATIONS

Xiu X et al: "AHG12: Evaluation of GPM with MMVD for coding efficiency improvement over WVC" , 22. JVET Meeting; Apr. 20, 2021-Apr. 28, 2021; Teleconference; (The Joint Video Exploration Team of ISO/HEC JTC1/SC29/WG11 and ITU-T SG.16 ), No. JVET-V0125, pp. 1-4 (Year: 2021).*

(Continued)

*Primary Examiner* — Kaitlin A Retallick
(74) *Attorney, Agent, or Firm* — ArentFox Schiff LLP

(57) ABSTRACT

In a method of decoding, coded information of a block is received from a coded video bitstream. The coded information indicates that the block is partitioned based on a geometry partition mode (GPM) into a first part and a second part and inter predicted based on merge mode with motion vector difference (MMVD). That a motion vector for the first part of the block partitioned by GPM is not identical to a motion vector for the second part of the block partitioned by GPM is determined. The block is further reconstructed based on the motion vector for the first part of the block and the motion vector for the second part of the block.

20 Claims, 15 Drawing Sheets

(56) References Cited

OTHER PUBLICATIONS

International Search Report issued Jun. 30, 2022 in Application No. PCT/US2022/071892, pp. 1-12.
Supplementary European Search Report issued Jun. 28, 2023 in Application No. 22773382.1, pp. 1-9.
Panusopone K et al: "GEO with MMVD", 130. MPEG Meeting; Apr. 20, 2020-Apr. 24, 2020; Alpbach; (Motion Picture Expert Group or ISO/IEC JTC1/SC29/WG11), No. m53259 ; JVET-R0282, Apr. 15, 2020, pp. 1-3.
Xiu X et al: "AHG12: Evaluation of GPM with MMVD for coding efficiency improvement over VVC", 22. JVET Meeting; Apr. 20, 2021-Apr. 28, 2021; Teleconference; (The Joint Video Exploration Team of ISO/IEC JTC1/SC29/WG11 and ITU-T SG.16 ), No. JVET-V0125, pp. 1-4.
Office Action received for Chinese Patent Application No. 202280003736.7, mailed on Mar. 25, 2024, 52 pages.

* cited by examiner

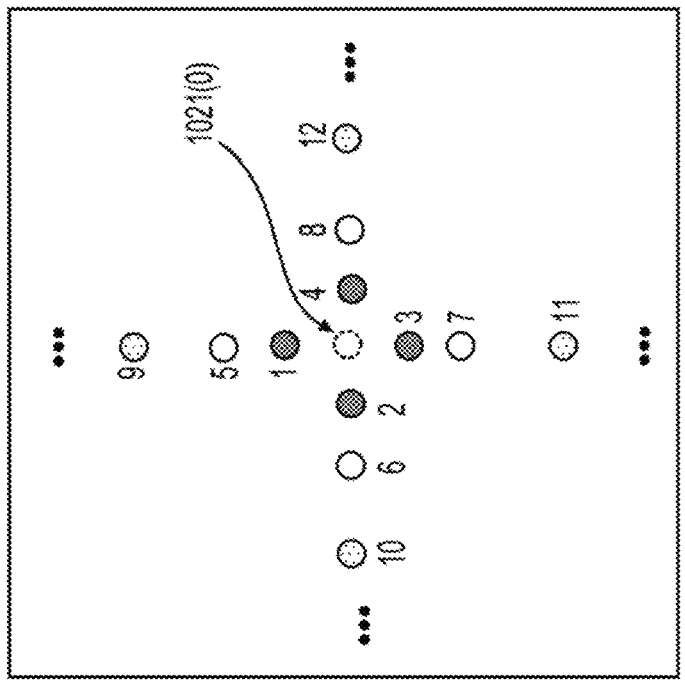
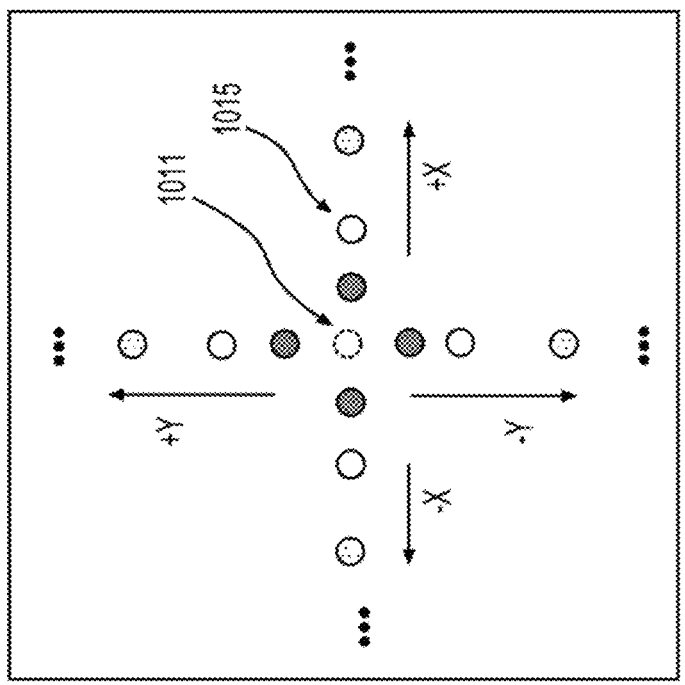
FIG. 9B
FIG. 9A

GEOMETRY PARTITION MODE AND MERGE MODE WITH MOTION VECTOR DIFFERENCE SIGNALING

INCORPORATION BY REFERENCE

This present disclosure claims the benefit of priority to U.S. Provisional Application No. 63/179,912, "GPM MMVD Signaling" filed on Apr. 26, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry.

According to an aspect of the disclosure, a method of decoding performed in a decoder is provided. In the method, coded information of a block can be received from a coded video bitstream. The coded information can indicate that the block is partitioned based on a geometry partition mode (GPM) into a first part and a second part and inter predicted based on merge mode with motion vector difference (MMVD). The GPM can include a plurality of angle indexes and a plurality of edge indexes. The plurality of angle indexes can indicate angles and the plurality of edge indexes can indicate edge positions that are relative to a center of the block. The MMVD can include a plurality of distance indexes and a plurality of direction indexes. The plurality of distance indexes can indicate distances and the plurality of direction indexes can indicate directions with respect to a starting motion vector. That a motion vector for the first part of the block partitioned by GPM is not identical to a motion vector for the second part of the block partitioned by GPM can be determined. The block can be reconstructed based on the motion vector for the first part of the block and the motion vector for the second part of the block.

In the method, (i) an offset value of the MMVD and a motion vector prediction of the GPM for the first part and (ii) an offset value of the MMVD and a motion vector prediction of the GPM for the second part of the block can be determined. The motion vector for the first part of the block can be determined based on the offset value of the MMVD and the motion vector prediction of the GPM for the first part of the block. The motion vector for the second part of the block can be determined based on (i) the offset value of the MMVD and the motion vector prediction of the GPM for the second part of the block, and (ii) the motion vector for the first part of the block.

In the method, to determine the offset value of the MMVD for the first part and the offset value of the MMVD for the second part, the offset value of the MMVD for the first part of the block can be determined based on a product of a first distance value and a first direction value. The offset value of the MMVD for the second part of the block can be determined based on a product of a second distance value and a second direction value. The first distance value can be obtained based on first distance index information. The first direction value can be obtained based on first direction index information. The second distance value can be obtained based on second distance index information and the motion vector of the first part of the block. The second direction value can be obtained based on second direction index information.

In some embodiments, the motion vector for the second part of the block can be determined to be equal to a sum of the offset value of the MMVD for the second part of the block and the motion vector prediction of the GPM for the second part of the block, in response to the sum of the offset value of the MMVD for the second part of the block and the motion vector prediction of the GPM for the second part of the block being not equal to the motion vector for the first part of the block.

In some embodiments, to determine the motion vector for the second part of the block, in response to a sum of the offset value of the MMVD for the second part of the block and the motion vector prediction of the GPM for the second part of the block being equal to the motion vector for the first part of the block, a modified offset value of the MMVD can be determined based on a product of a modified second distance value and the second direction value for the second part of the block, where the modified second distance value can be obtained based on the second distance index information plus one. The motion vector for the second part of the block can subsequently be determined to be equal to a sum of the modified offset value of the MMVD for the second part of the block and the motion vector prediction of the GPM for the second part of the block.

In some embodiments, in accordance with a conformance requirement, the motion vector for the first part of the block partitioned by GPM may not be identical to the motion vector for the second part of the block partitioned by GPM.

According to another aspect of the disclosure, a method of video decoding performed in a video decoder is provided. In the method, a single syntax element associated with a block can be received from a coded video bitstream. The single syntax element can indicate whether both (i) the block is partitioned based on a geometry partition mode (GPM) into a first part and a second part and (2) each of the first part and the second part is inter predicted based on merge mode with motion vector difference (MMVD). The GPM can include a plurality of angle indexes and a plurality of edge indexes. The plurality of angle indexes can indicate angles and the plurality of edge indexes can indicate edge positions that are relative to a center of the block. The MMVD can include a plurality of distance indexes and a plurality of direction indexes. The plurality of distance indexes can indicate distances and the plurality of direction indexes can indicate directions with respect to a starting motion vector. A determination can be made to determine an offset value of the MMVD for both the first part and the second part of the block in response to the single syntax element being a first value. A motion vector can be determined for the first part of the block based on the offset value of the MMVD and a motion vector prediction of the GPM for the first part of the block. A motion vector can be determined for the second part of the block based on the offset value of the MMVD and a motion vector prediction of the GPM for the second part of the block. The block can be reconstructed based on the determined motion vector for the first part of the block and the determined motion vector for the second part of the block.

In some embodiments, to determine the offset value of the MMVD for both the first part and the second part of the block in response to the single syntax element being the first value, distance index information and direction index information associated with the MMVD can be received. A distance value can be determined based on the distance index information and a direction value can be determined based on the direction index information. The offset value of the MMVD for the first part of the block and the offset value of the MMVD for the second part of the block can be determined to be equal to a product of the distance value and the direction value.

In some embodiments, to determine the offset value of the MMVD for both the first part and the second part of the block in response to the single syntax element being the first value, distance index information and direction index information associated with the MMVD can be received. A distance value can be determined based on the distance index information and a direction value can be determined based on the direction index information. The offset value of the MMVD for the first part of the block can be determined based on a product of the distance value and the direction value. The offset value of the MMVD for the second part of the block can be determined based on a product of the distance value and a modified direction value, where the modified direction value can be opposite to the direction value.

In some embodiments, to determine the offset value of the MMVD for both the first part and the second part of the block in response to the single syntax element being the first value, position index information associated with the MMVD can be received from the coded video bitstream. The position index information can indicate a combination of distance information and direction information associated with the MMVD for the first part and the second part of the block. The offset value of the MMVD for the first part of the block and the offset value of the MMVD for the second part of the block can be determined based on the distance information and the direction information.

In some embodiments, the position index information can be coded based on a variable-length coding.

According to another aspect of the disclosure, an apparatus is provided. The apparatus has processing circuitry.

The processing circuitry is configured to perform the disclosed methods for video coding.

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which:

FIGS. 9A and 9B show search points of MMVD in accordance with an embodiment.

DETAILED DESCRIPTION OF EMBODIMENTS

Figure 1:
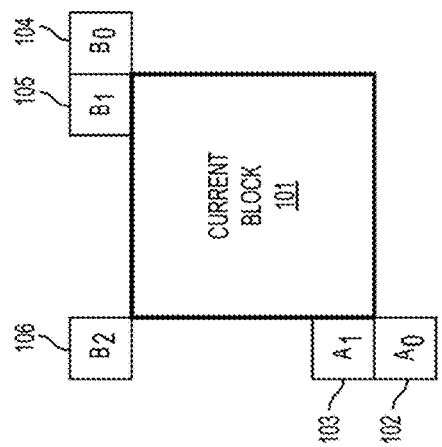
FIG. 1 is a schematic illustration of a current block and its surrounding spatial merge candidates in one example.
Figure 2:
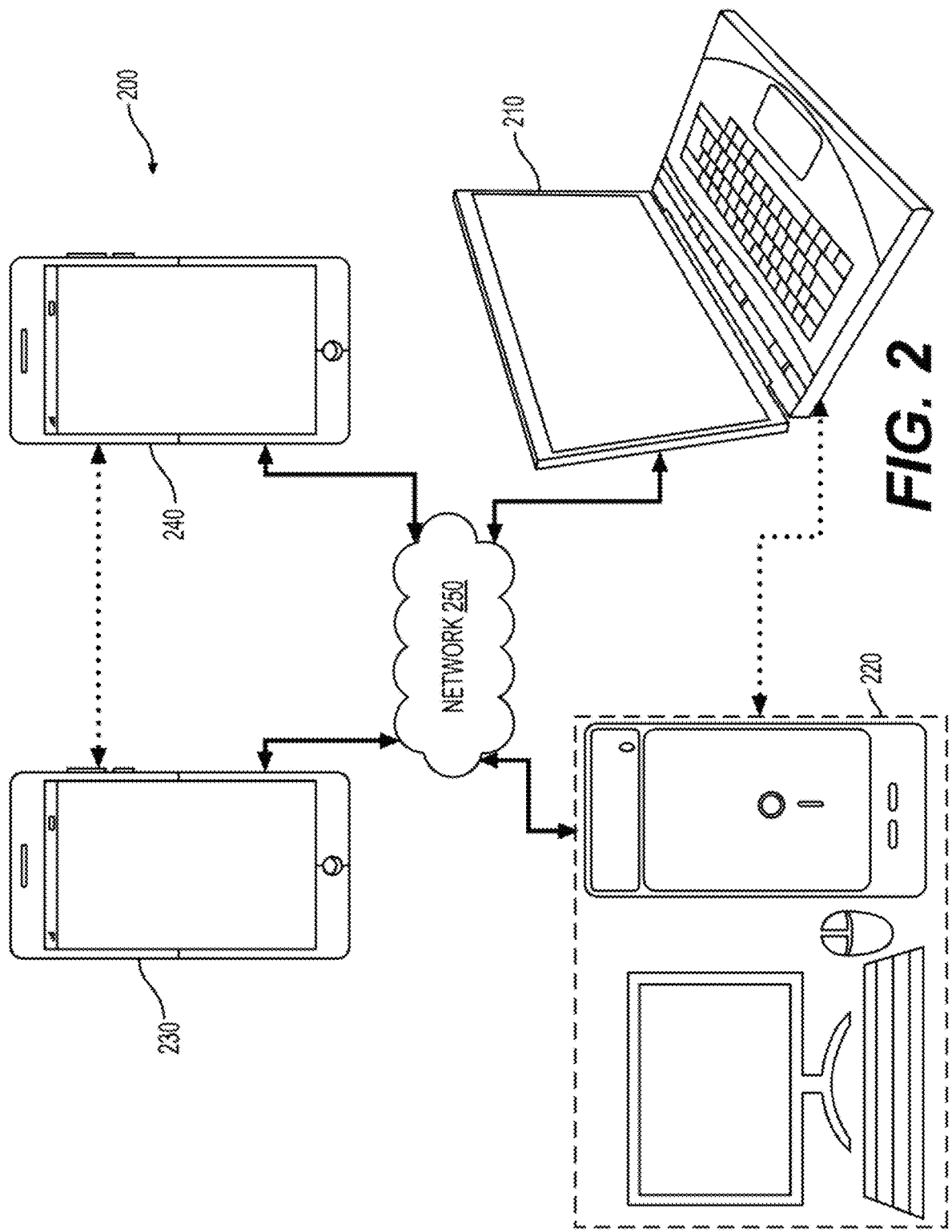
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
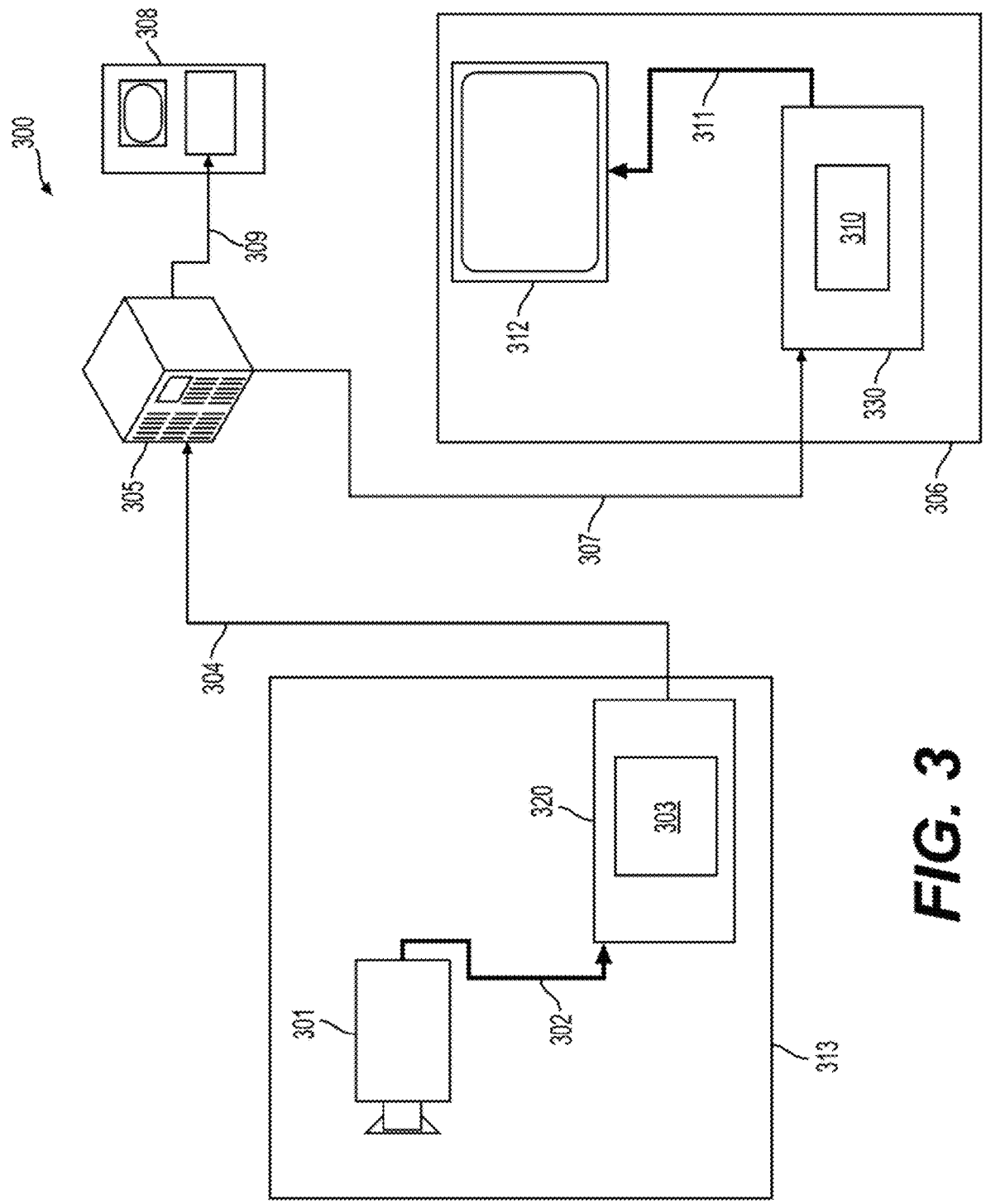
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308)

in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
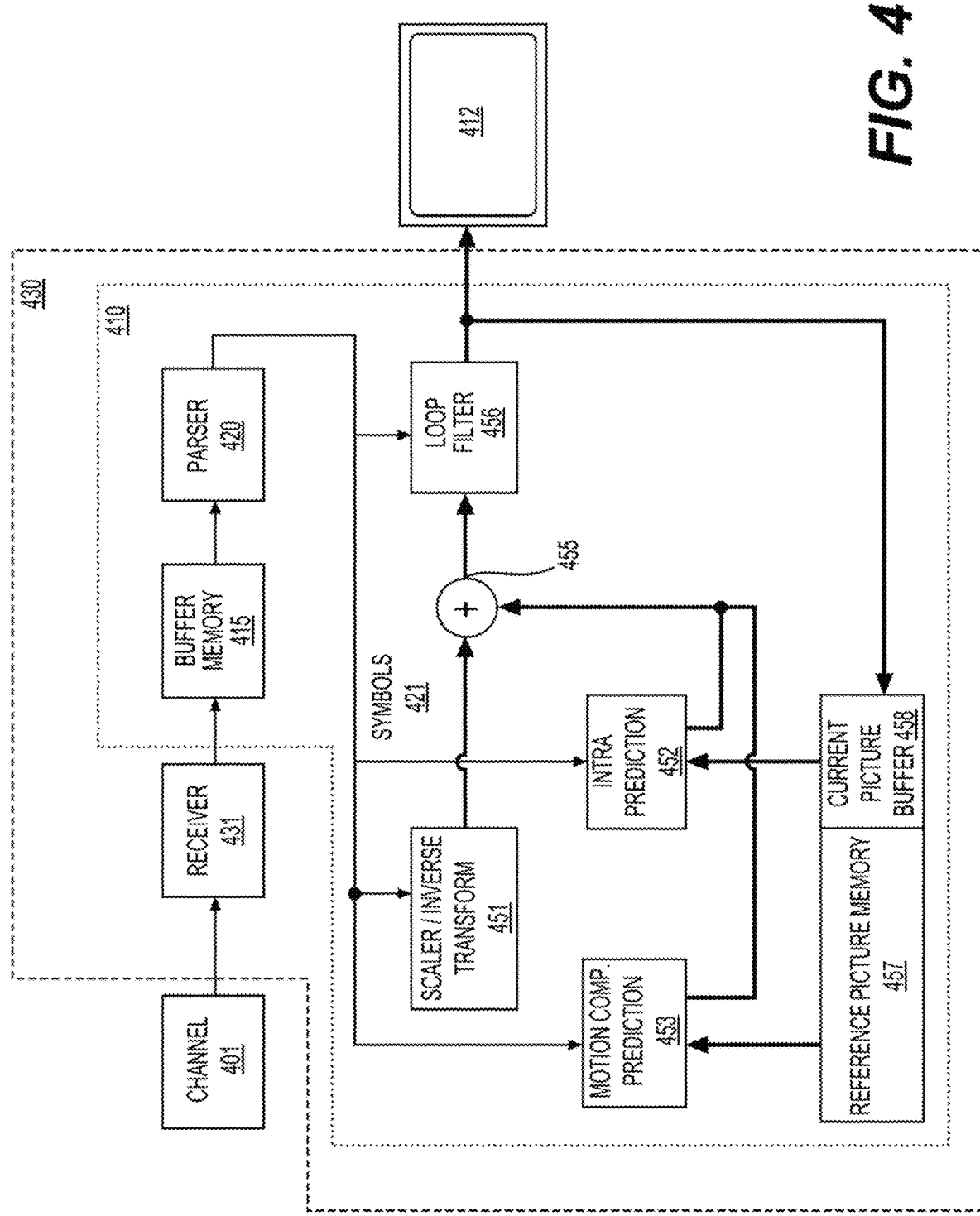
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
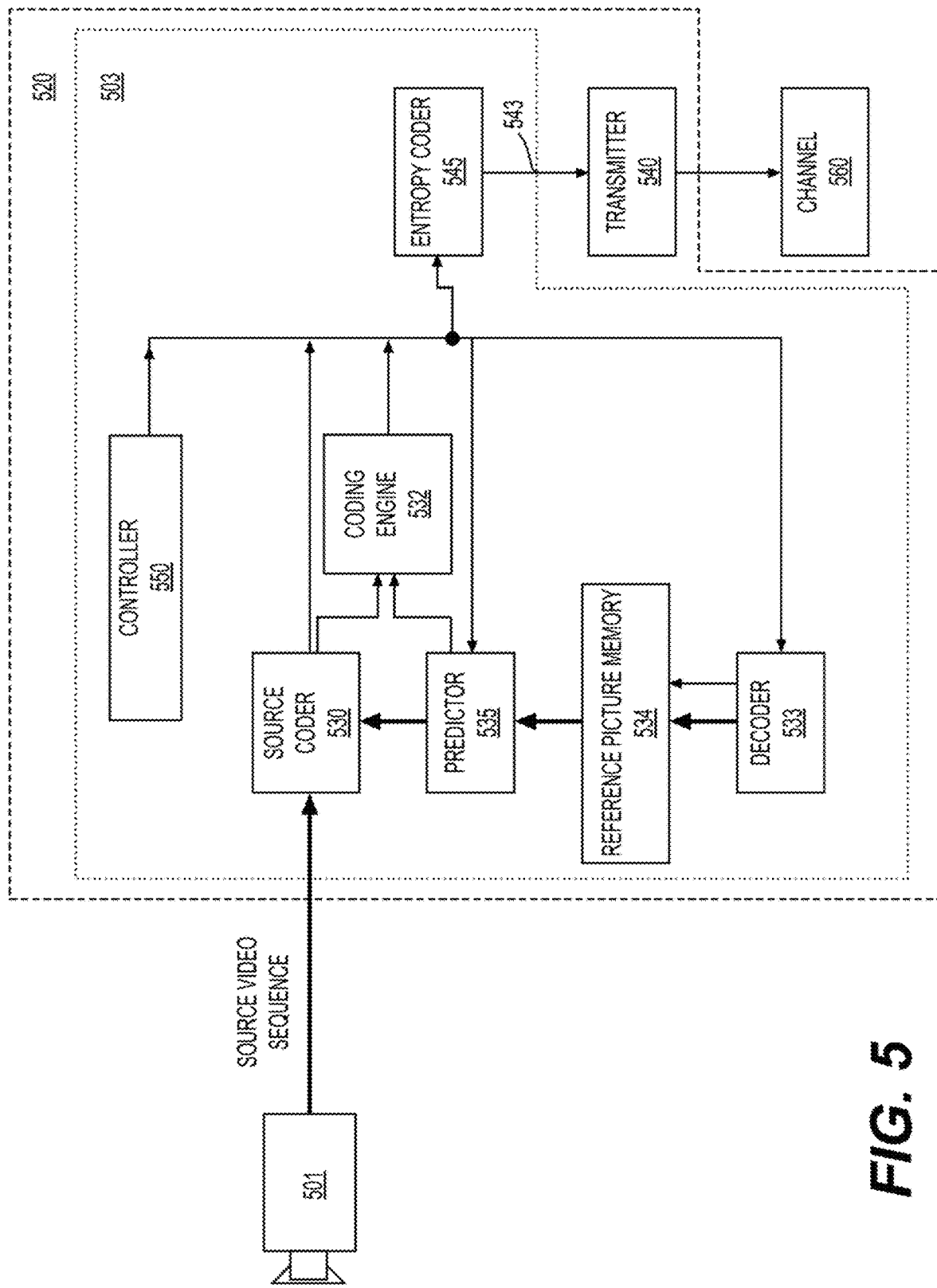
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously coded picture from the video sequence that were designated as "reference pictures." In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
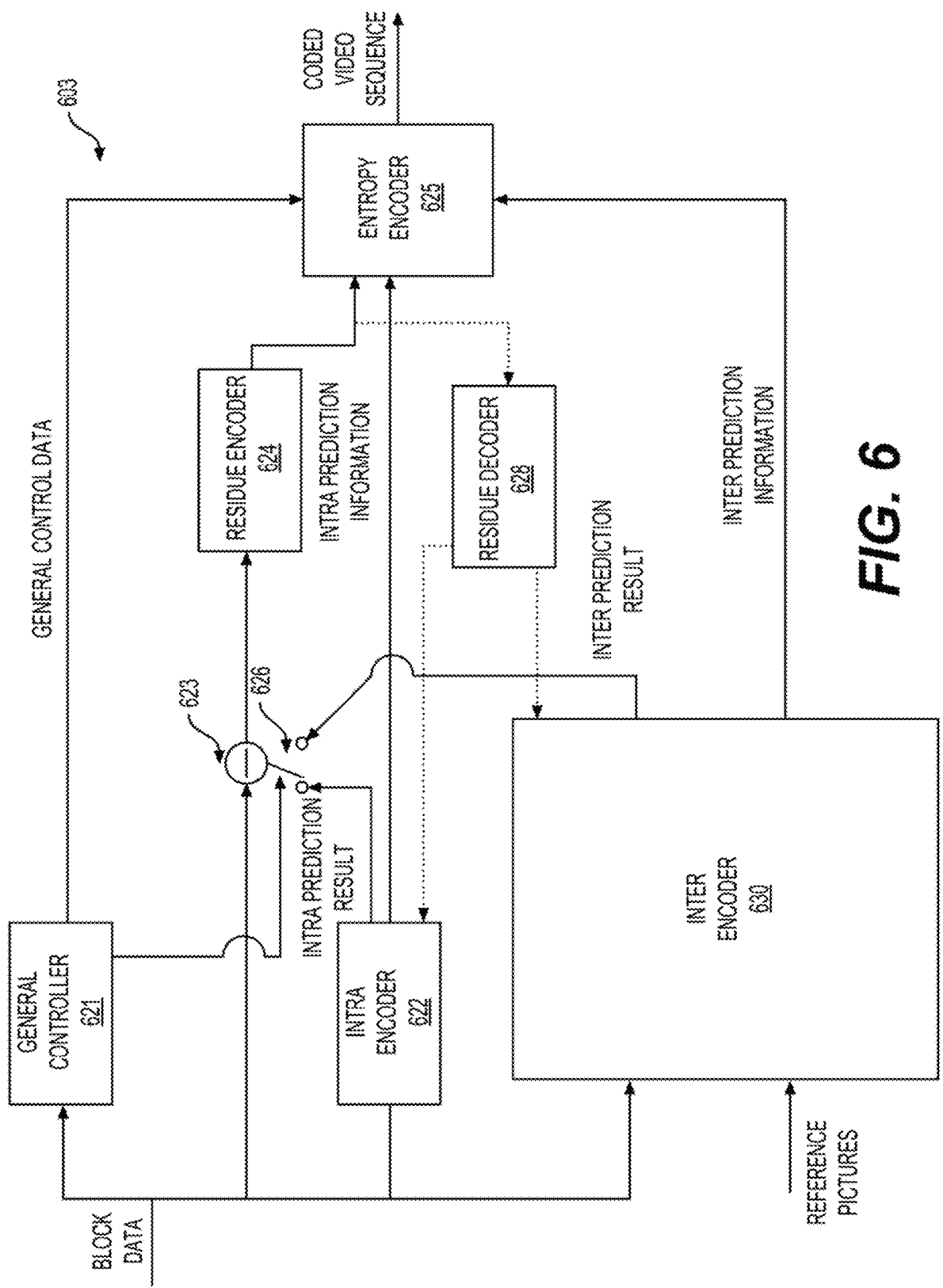
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
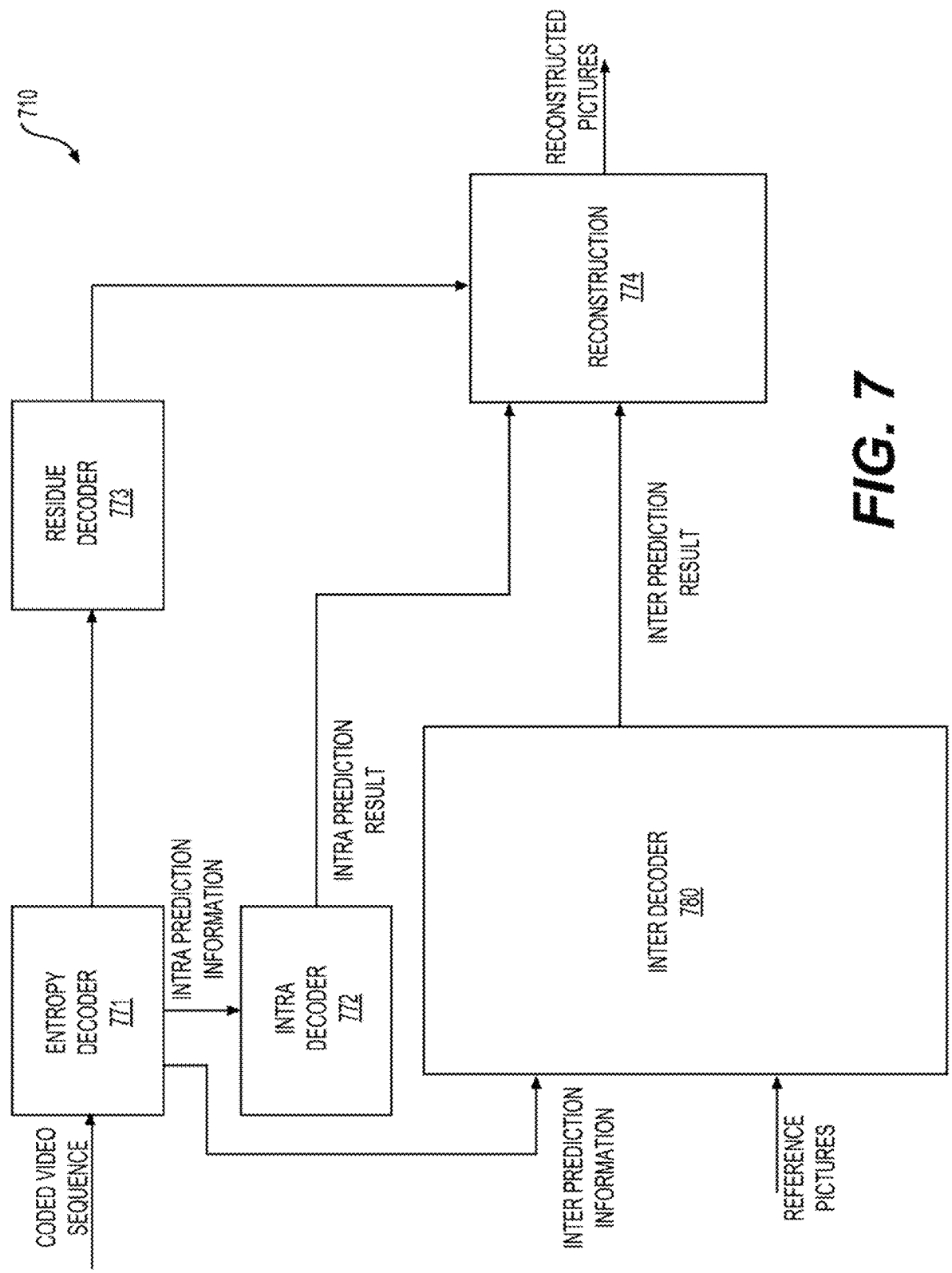
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

The disclosure includes signaling of MV difference (MVD) for Geometry partition mode (GPM).

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). In 2015, these two standard organizations jointly formed the JVET (Joint Video Exploration Team) to explore the potential of developing the next video coding standard beyond HEVC. In April 2018, JVET formally launched the standardization process of next-generation video coding beyond HEVC. The new standard was named Versatile Video Coding (VVC), and JVET was renamed as Joint Video Expert Team. In July 2020, H.266/VVC version 1 was finalized. In January 2021, an Ad Hoc Group was established to investigate enhanced compression beyond VVC capability.

In the inter prediction of VVC, for each inter-predicted CU, motion parameters can include motion vectors, reference picture indices and reference picture list usage index, and additional information needed for inter-predicted sample generation. The motion parameters can be signaled in an explicit or implicit manner. When a CU is coded with a skip mode, the CU can be associated with one PU and have no significant residual coefficients, no coded motion vector delta, or no reference picture index. When a CU is coded with a merge mode, the merge mode can be specified by the motion parameters for the CU. The motion parameters can be obtained from neighboring CUs and include spatial and temporal candidates. The merge mode can be applied to any inter-predicted CU, not only for skip mode. An alternative to merge mode is an explicit transmission of motion parameters. In the explicit transmission of the motion parameters, a motion vector, corresponding reference picture index for each reference picture list and reference picture list usage flag, and other needed information can be signaled explicitly per each CU.

VVC can include a number of new and refined inter prediction coding tools. For example, in addition to merge mode, where the implicitly derived motion information is directly used for prediction samples of a CU, the merge mode with motion vector differences (MMVD) is introduced in VVC. In MMVD, a MMVD flag can be signaled right after sending a skip flag or merge flag to specify whether the MMVD mode is used for the CU.

In MMVD, after a merge candidate is selected, MMVD is further refined by the signaled MVDs information. The MVDs information can include a merge candidate flag, an index to specify motion magnitude, and an index for indication of motion direction. In MMVD, one of the first two candidates in the merge list can be selected as a MV basis (also referred to as a starting point or a starting MV). The merge candidate flag can be signaled to specify which one of the first two candidates is used.

Figure 8:
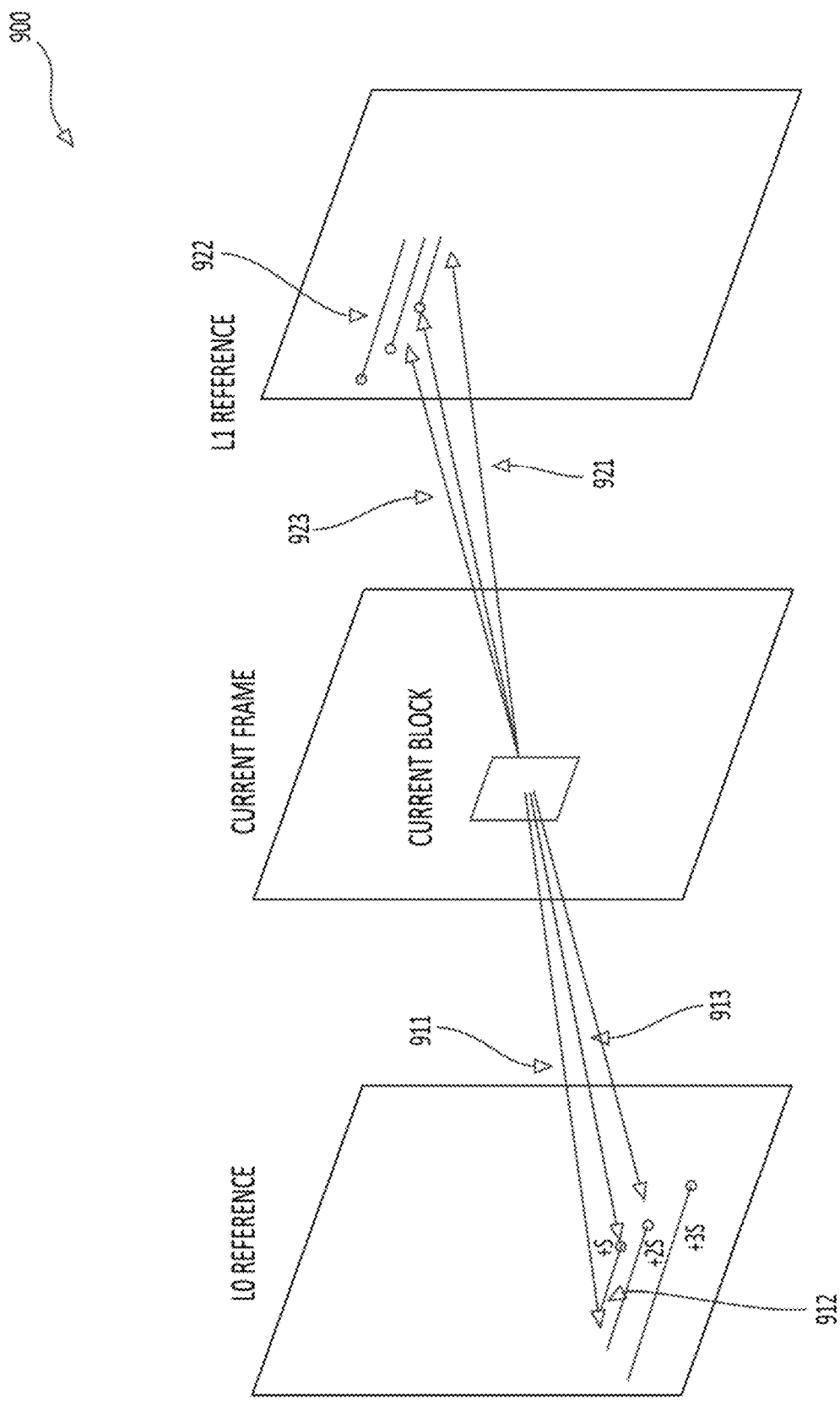
FIG. 8 shows a search process of merge mode with motion vector difference (MMVD) in accordance with an embodiment.

In MMVD, a distance index can specify motion magnitude information and indicate a pre-defined offset from the starting point. As shown in FIG. 8, a current frame can have a first reference frame (e.g., L0 reference or list0 reference) and a second reference frame (e.g., L1 reference or list1 reference). Each of the L0 reference and the L1 reference can include a respective starting point. As shown in FIGS. 9A and 9B, an offset can be added to either horizontal component or vertical component of a starting MV. The relation of the distance index and a pre-defined offset can be specified in Table 1. When a full-pel MMVD flag (e.g., slice_fpel_mmvd_enabled_flag) is equal to 0, the range of MMVD offset can be from ¼ luma samples to 32 luma samples. When the full-pel MMVD flag (e.g., slice_fpel_mmvd_enabled_flag) is 1, the range of MMVD offset can be from 1 luma sample to 128 luma samples.

TABLE 1

| the relation of a distance index and a pre-defined offset | | | | | | | | |
|---|---|---|---|---|---|---|---|---|
| Distance IDX | 0 | 1 | 2 | 3 | 4 | 5 | 6 | 7 |
| Offset (in unit of luma sample) Full-pel MMVD off | ¼ | ½ | 1 | 2 | 4 | 8 | 16 | 32 |
| Offset (in unit of luma sample) Full-pel MMVD on | 1 | 2 | 4 | 8 | 16 | 32 | 64 | 128 |

A direction index can represent the direction of the MVD relative to the starting point. The direction index can represent four directions as shown in Table 2. It is noted that the meaning of MVD sign can vary according to the information of the starting MVs in the L0 reference and L1 reference. When the starting MVs is (i) an uni-prediction MV or (ii) are bi-prediction MVs with both pointing to the same side of the current picture (i.e., picture order counts (POCs) of two references (e.g., the L0 and L1 references) are both larger than the POC of the current picture, or are both smaller than the POC of the current picture), the sign in Table 2 can specify the sign of MV offset added to the starting MV. When the starting MVs are bi-prediction MVs with the two MVs pointing to the different sides of the current picture (i.e., the POC of one reference is larger than the POC of the current picture, and the POC of the other reference is smaller than the POC of the current picture), the sign in Table 2 can specify the sign of MV offset added to the list0 MV component of the starting MV and the sign for the list1 MV has an opposite value.

TABLE 2

| Sign of MV offset specified by direction index | | | | |
|---|---|---|---|---|
| Direction IDX | 00 | 01 | 10 | 11 |
| x-axis | + | − | N/A | N/A |
| y-axis | N/A | N/A | + | − |

FIG. 8 shows an exemplary search process of MMVD. As shown in FIG. 8, the starting point MV can be shown by (911) (e.g., according to the direction IDX and a base candidate IDX), the offset can be shown by (912) (e.g., according to the distance IDX and the direction IDX), and the final MV predictor can be shown by (913) in FIG. 8. In another example, the starting point MV can be shown by (921) (e.g., according to the direction IDX and a base candidate IDX), the offset can be shown by (922) (e.g., according to the distance IDX and the direction IDX), and the final MV predictor can be shown by 923 in FIG. 8.

FIGS. 9A and 9B show exemplary search points of the MMVD. As shown in FIG. 9A, the starting point MV can be shown by (1011) (e.g., according to the direction IDX and a base candidate IDX). In the FIG. 9A example, 4 search directions, such as +Y, −Y, +X and −X, are used, and the four search directions can be indexed by 0, 1, 2, 3. The distance can be indexed by 0 (0 distance to the starting point MV), 1 (1 s to the starting point MV), 2 (2 s to the starting point MV), 3 (3 s to the starting point), and the like. Thus, when the direction IDX is 3, and the distance IDX is 2, the final MV predictor is shown as 1015.

In another example, the search direction and the distance can be combined for indexing. For example, the starting point MV is shown by (1021) (e.g., according to the direction IDX and a base candidate IDX). The search direction and the distance are combined to be indexed by 0-12 as shown in FIG. 9B.

In some embodiments, a mmvd merge flag (e.g., mmvd_merge_flag[x0][y0]) can be applied. When mmvd_merge_flag[x0][y0] is equal to 1, merge mode with motion vector difference can be used to generate the inter prediction parameters of the current coding unit. When mmvd_merge_flag[x0][y0] is equal to 0, merge mode with motion vector difference may not be used to generate the inter prediction parameters. The array indices x0, y0 can specify the location (x0, y0) of the top-left luma sample of the considered coding block relative to the top-left luma sample of the picture. When mmvd_merge_flag[x0][y0] is not present, mmvd_merge_flag[x0][y0] can be inferred to be equal to 0.

In some embodiments, a mmvd candidate flag (e.g., mmvd_cand_flag[x0][y0]) can be applied to specify whether the first (0) or the second (1) candidate in the merging candidate list is used with the motion vector difference derived from mmvd_distance_idx[x0][y0] and mmvd_direction_idx[x0][y0]. The array indices x0, y0 can specify the location (x0, y0) of the top-left luma sample of the considered coding block relative to the top-left luma sample of the picture. When mmvd_cand_flag[x0][y0] is not present, mmvd_cand_flag[x0][y0] can be inferred to be equal to 0.

In some embodiments, a mmvd distance flag (e.g., mmvd_distance_idx[x0][y0]) can be applied to specify the index used to derive MmvdDistance[x0][y0] as specified in Table 3. The array indices x0, y0 can specify the location (x0, y0) of the top-left luma sample of the considered coding block relative to the top-left luma sample of the picture.

largest distance $\rho_{max}$. The value of $\rho_{max}$ can be geometrically derived by Eq. (3) for either w or h. The w can be a width of the CU (1000) and the h can be a height of the CU (1000), which can be equal to 8 and scaled with log 2 scaled short edge length. When φ is equal to 0°, $\rho_{max}$ can be equal to w/2, and when φ is equal to 90°, $\rho_{max}$ can be equal to h/2. The shifted back "$\rho_{margin}$=1.0" samples for an 8×8 block is to avoid that the split boundary too close the corner.

TABLE 3

Specification of MmvdDistance[ x0 ][ y0 ] based on mmvd_distance_idx[ x0 ][ y0 ]

| | MmvdDistance[ x0 ][ y0 ] | |
|---|---|---|
| mmvd_distance_idx[ x0 ][ y0 ] | slice_fpel_mmvd_enabled_flag = = 0 | slice_fpel_mmvd_enabled_flag = = 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

In some embodiments, a mmvd direction flag (e.g., mmvd_direction_idx[x0][y0]) can be applied to specify index used to derive MmvdSign[x0][y0] as specified in Table 4. The array indices x0, y0 can specify the location (x0, y0) of the top-left luma sample of the considered coding block relative to the top-left luma sample of the picture.

$$\rho_{max}(\varphi, w, h) = \cos(\varphi)\left(\frac{h}{2\tan\left(\frac{\pi}{2} - \varphi\right)} + \frac{w}{2}\right) - \rho_{margin}, 0 < \varphi < \frac{\pi}{2} \quad \text{Eq. (3)}$$

TABLE 4

Specification of MmvdSign[ x0 ][ y0 ] based on mmvd_direction_idx[ x0 ][ y0 ]

| mmvd_direction_idx[ x0 ][ y0 ] | MmvdSign[ x0 ][ y0 ][0] | MmvdSign[ x0 ][ y0 ][1] |
|---|---|---|
| 0 | +1 | 0 |
| 1 | −1 | 0 |
| 2 | 0 | +1 |
| 3 | 0 | −1 |

Based on the distance value (e.g., MmvdDistance[x0][y0]) derived from Table 3, and the direction value (e.g., MmvdSign[x0][y0]), both components (e.g., X component and Y component) of the merge plus MVD offset (e.g., MmvdOffset[x0][y0]) can be derived as follows in Equations 1 and 2:

MmvdOffset[*x*0][*y*0][0]=(MmvdDistance[*x*0][*y*0]<<2)
  *MmvdSign[*x*0][*y*0][0]     Eq. (1)

MmvdOffset[*x*0][*y*0][1]=(MmvdDistance[*x*0][*y*0]<<2)
  *MmvdSign[*x*0][*y*0][1]     Eq. (2)

Where [0] can denote the X component of the MmvdOffset and [1] can denote the Y component of the MmvdOffset.

Figure 10:
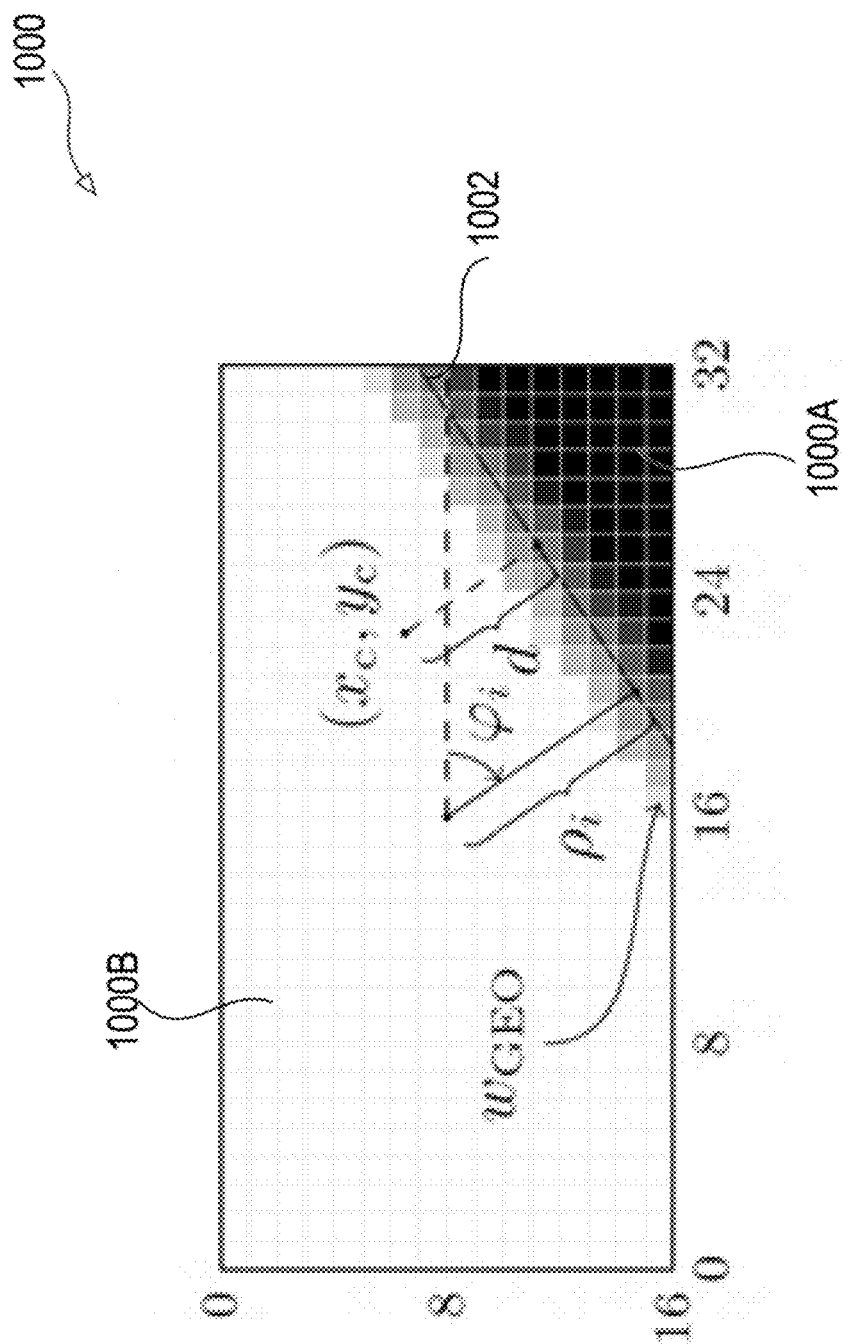
FIG. 10 shows a split boundary of geometric adaptive block partition (GEO) in accordance with an embodiment.

An example of geometry-adaptive block partition (GEO) was previously proposed. GEO can support 140 different partitioning manners, differentiated by 32 angles (e.g., quantized between 0 and 360° with 11.25° of equal separation) and 5 edges relative to the center of a CU, in addition to triangle prediction mode (TPM) to split a CU into two parts. FIG. 10 shows a split boundary (1002) of geometric merge mode (GEO) in a CU (1000). As shown in FIG. 10, the CU (1000) can be split by the split boundary (1002) into a first part (1000A) and a second part (1000B). Further, an angle $\varphi_i$ can represent a quantized angle between 0 and 360 degrees and a distance offset $\rho_i$ can represent a quantized offset of the where $\rho_{margin}$=1.0     Eq. (4)

In GEO, each partition mode (e.g., a pair of an angle index and an edge index) can be assigned with a pixel-adaptive weight table to blend samples on the two partitioned parts, where the weighting value of a sample can range from 0 to 8, and can be determined by a L2 distance which is defined from the center position of a pixel (or CU) to the edge. Basically, unit-gain constraint can be followed when weight values are assigned. Thus, when a small weight value is assigned to a GEO partition, a large complementary one can be assigned to the other partition, summing up to 8.

A combination of MMVD and GPM, such as geometric prediction mode with Motion Vector Difference (GMVD) was previously proposed. A GMVD flag can be firstly signaled for a GPM CU (or a CU that is partitioned by GPM), to specify whether the GMVD mode is used. If the GMVD flag is true, each geometric partition of a GPM CU can further determine whether to use GMVD or not. If GMVD is used to a geometric partition, after a GPM merge candidate is selected, the motion of the partition can be further refined by the signaled MVDs information. All other procedures can be kept the same as in GPM.

With GMVD, an MVD can be signaled as a pair of distance and direction, similar as in MMVD. There can be nine candidate distances (e.g., ¼-pel, ½-pel, 1-pel, 2-pel, 3-pel, 4-pel, 6-pel, 8-pel, and 16-pel), and eight candidate directions (e.g., four horizontal/vertical directions and four diagonal directions) involved in GMVD. In addition, when a picture level full-pel MMVD flag (e.g., pic_fpel_mmvd_enabled_flag) is equal to 1, the MVD in GMVD can also be left shifted by 2 as in MMVD.

Another combination of MMVD and GPM was proposed in JVET-V0125. Table 5 shows an exemplary syntax table to signal MMVD information on top of GPM.

TABLE 5

Syntax table to show a combination of MMVD and GPM

```
} else {
    if( sps_ciip_enabled_flag && sps_gpm_enabled_flag &&
        sh_slice_type = = B &&
        cu_skip_flag[ x0 ][ y0 ] = = 0 && cbWidth >=
        8 && cbHeight
>= 8 &&
        cbWidth < ( 8 * cbHeight) && cbHeight < ( 8 * cbWidth
    ) &&
        cbWidth < 128 && cbHeight < 128 )
        ciip_flag[ x0 ][ y0 ]                                    ae(v)
    if( ciip_flag[ x0 ][ y0 ] && MaxNumMergeCand > 1 )
        merge_idx[ x0 ][ y0 ]                                    ae(v)
    if( ! ciip_flag[ x0 ][ y0 ] ) {
        merge_gpm_partition_idx[ x0 ][ y0 ]                      ae(v)
        merge_gpm_mmvd_enable_flag0[ x0 ][ y0 ]                  ae(v)
        if(merge_gpm_mmvd_enable_flag0) {
            merge_gpm_mmvd_distance_idx0[ x0 ][ y0 ]             ae(v)
            merge_gpm_mmvd_direction_idx0[ x0 ][ y0 ]            ae(v)
        }
        merge_gpm_mmvd_enable_flag1[ x0 ][ y0 ]                  ae(v)
        if(merge_gpm_mmvd_enable_flag1) {
            merge_gpm_mmvd_distance_idx1[ x0 ][ y0 ]             ae(v)
            merge_gpm_mmvd_direction_idx1[ x0 ][ y0 ]            ae(v)
        }
        merge_gpm_idx0[ x0 ][ y0 ]                               ae(v)
        if (MaxNumGpmMergeCand > 2)
            merge_gpm_idx1[ x0 ][ y0 ]                           ae(v)
    }
}
```

Additionally, to enable more flexible combinations of MV refinements for two GPM partitions, the following conditions can be applied to the signaled values of a first partition of GPM (e.g., merge_gpm_idx0) and a second partition of GPM (e.g., merge_gpm_idx1): (1) when both the first partition and the second GPM partition do not apply MV refinement (i.e., merge_gpm_mmvd_enable_flag0 and merge_gpm_mmvd_enable_flag1 are equal to 0), the merge indices of two GPM partitions are disallowed to be identical; (2) when one of the two GPM partitions applies the MV refinement and the other does not (e.g., one of merge_gpm_mmvd_enable_flag0 and merge_gpm_mmvd_enable_flag1 is equal to 1 and the other is equal to 0), the merge indices of two GPM partitions are allowed to be identical; and (3) when both of two GPM partitions apply the MV refinement (e.g., merge_gpm_mmvd_enable_flag0 and merge_gpm_mmvd_enable_flag1 are equal to 1), the merge indices are allowed to be the same when the MV refinements of two partitions are different, and disallowed to be the same when the two MV refinements are identical.

Due to the blending process in GPM, the MVs of the two partitions can be constrained to be different. However, when combining GPM and MMVD, such a constraint cannot be kept by signaling, which is inefficient. Another issue is that the signaling cost of the MMVD enabled flag, MMVD distance index, and MMVD direction index can be expensive when both the two GPM partitions need to be signaled. The signaling cost could be reduced in certain ways.

In an embodiment of the disclosure, the signaling of MMVD information can still be performed on top of GPM, but the final MVs of GPM can be derived adaptively at a CU level to avoid the case that GPM motion vector plus MMVD information become the same for two GPM partitions.

In an example, the derivation of an offset value (e.g., MmvdOffset0) for the first partition of the GPM can still be same and illustrated as Equations (5) and (6):

$$MmvdOffset0[0]=(MmvdDistance0<<2)*MmvdSign0[0] \qquad \text{Eq. (5)}$$

$$MmvdOffset0[1]=(MmvdDistance0<<2)*MmvdSign0[1] \qquad \text{Eq. (6)}$$

where MmvdDistance0 can be looked up from Table 3 with distance index (e.g., merge_gpm_mmvd_distance_idx0) as input, and a direction value (e.g., MmvdSign0) can be looked up from Table 4 with direction index (e.g., merge_gpm_mmvd_direction_idx0) as input. [0] can denote a X component of the MmvdOffset0 and [1] can denote a Y component of the MmvdOffset0. The final MV0 of partition 0 (or the first partition) can be derived as in Equations (7) and (8).

$$MV0[0]=MVP0[0]+MmvdOffset0[0] \qquad \text{Eq. (7)}$$

$$MV0[1]=MVP0[1]+MmvdOffset0[1] \qquad \text{Eq. (8)}$$

where MVP0 can indicate the MV prediction of GPM for partition 0 (or the first partition). [0] can denote a X component of the MV0 and [1] can denote a Y component of the MV0.

For the second partition of GPM, the derivation of an offset value (e.g., MmvdOffset1) for the second partition of the GPM can be shown in Equations (9) and (10):

$$MmvdOffset1[0]=(MmvdDistance1<<2)*MmvdSign1[0] \qquad \text{Eq. (9)}$$

$$MmvdOffset1[1]=(MmvdDistance1<<2)*MmvdSign1[1] \qquad \text{Eq. (10)}$$

where MmvdDistance1 can be looked up from Table 3 with merge_gpm_mmvd_distance_idx1 as input, and MmvdSign1 can be looked up from Table 4 with merge_gpm_mmvd_direction_idx1 as input. [0] can denote the X component of the MmvdOffset1 and [1] can denote the Y component of the MmvdOffset1. Further, a comparison between (MVP1[0]+MmvdOffset1 [0]) and MV0 [0], and a comparison between (MVP1[1]+MmvdOffset1[1]) and MV0[1] can be performed. When (MVP1[0]+MmvdOffset1 [0]) is equal to MV0[0] and (MVP1[1]+MmvdOffset1[1]) is equal to MV0[1], it can denote that the first partition and the second partition of the GPM point to a same reference frame. Accordingly, a modified offset value (e.g., MmvdOffset1') of MMVD can be derived by table lookup with (merge_gpm_mmvd_distance_idx1+1) and merge_gpm_mmvd_direction_idx1 as input. The modified MmvdOffset1' can be shown in Equations (11) and (12):

$$MmvdOffset1[0]'=(MmvdDistance1'<<2)*MmvdSign1[0] \qquad \text{Eq. (11)}$$

$$MmvdOffset1[1]'=(MmvdDistance1'<<2)*MmvdSign1[1] \qquad \text{Eq. (12)}$$

where a modified distance value (e.g., MmvdDistance1') can be looked up from Table 3 with merge_gpm_mmvd_distance_idx1+1 as input, and a direction value (e.g., MmvdSign1)

can be looked up from Table 4 with merge_gpm_mmvd_direction_idx1 as input. [0] can denote the X component of the modified offset value MmvdOffset1' and [1] can denote the Y component of the modified offset value MmvdOffset1'. The final MV1 of partition 1 (or the second partition) can be derived as in Equations (13) and (14).

$$MV1[0]=MVP1[0]+MmvdOffset1[0]' \quad \text{Eq. (13)}$$

$$MV1[1]=MVP1[1]+MmvdOffset1[1]' \quad \text{Eq. (14)}$$

where MVP1 can indicate the MV prediction of GPM for partition 1 (or the second partition). [0] can denote a X component of the MV1 and [1] can denote a Y component of the MV1. Otherwise, when (MVP1[0]+MmvdOffset1 [0]) is not equal to MV0[0] and/or (MVP1[1]+MmvdOffset1 [1]) is not equal to MV0[1], MmvdOffset1 can be derived using merge_gpm_mmvd_distance_idx1 and merge_gpm_mmvd_direction_idx1 as input. Thus, an offset value (e.g., MmvdOffset1) of MMVD for the second partition can be obtained based on Equations (9) and (10). Accordingly, the final MV1 of partition 1 (or the second partition) can be derived as in Equations (15) and (16).

$$MV1[0]=MVP1[0]+MmvdOffset1[0] \quad \text{Eq. (15)}$$

$$MV1[1]=MVP1[1]+MmvdOffset1[1] \quad \text{Eq. (16)}$$

where MVP1 can indicate the MV prediction of GPM for partition 1 (or the second partition). [0] can denote a X component of the MV1 and [1] can denote a Y component of the MV1.

In another example, a conformance requirement is not to signal MMVD for a block coded with GPM such that the final MVs (e.g., MV0 and MV1) of the two GPM partitions are identical. Accordingly, in accordance with the conformance requirement, the motion vector (e.g., MV0) for the first part of the CU partitioned by GPM is not identical to the motion vector (e.g., MV1) for the second part of the CU partitioned by GPM.

In another embodiment of the disclosure, a MMVD enable flag, such as merge_gpm_mmvd_enable_flag, can be signaled to indicate whether MMVD is enabled for a block coded with GPM mode. When the MMVD enable flag is true, MMVD can be applied for both the GPM partitions (e.g., the first partition and the second partition).

In an example, when merge_gpm_mmvd_enable_flag is true, one set of MMVD distance index and MMVD direction index can be signaled. Accordingly, a distance value (e.g., MmvdDistance) and a direction value (e.g., MmvdSign) can be obtained based on Table 3 and Table 4 respectively by using the MMVD distance index and MMVD direction index as inputs. A same MV offset can be applied for both GPM partitions. Equations (17) and (18) show the MV offset in the first partition and Equations (19) and (20) show the MV offset in the second partition.

$$MmvdOffset0[0]=(MmvdDistance<<2)*MmvdSign[0] \quad \text{Eq. (17)}$$

$$MmvdOffset0[1]=(MmvdDistance<<2)*MmvdSign[1] \quad \text{Eq. (18)}$$

$$MmvdOffset1[0]=(MmvdDistance<<2)*(MmvdSign[0]) \quad \text{Eq. (19)}$$

$$MmvdOffset1[1]=(MmvdDistance<<2)*(MmvdSign[1]) \quad \text{Eq. (20)}$$

where [0] can denote a X component and [1] can denote a Y component.

In another example, when merge_gpm_mmvd_enable_flag is true, one set of MMVD distance index and MMVD direction index can be signaled. The MV offset of the first GPM partition can be derived by the signaled MMVD distance index and MMVD direction index, which can be shown in Equations (21) and (22). The MV offset of the second GPM partition can be derived by the signaled MMVD distance index, and a modified MMVD direction index based on the signaled MMVD direction index. Thus, the MV offset of the first partition (e.g., MmvdOffset0) can be derived as follows in Equations (21) and (22):

$$MmvdOffset0[0]=(MmvdDistance<<2)*MmvdSign[0] \quad \text{Eq. (21)}$$

$$MmvdOffset0[1]=(MmvdDistance<<2)*MmvdSign[1] \quad \text{Eq. (22)}$$

The MVD offset of the second partition (e.g., MmvdOffset1) can be derived based on Equations (23) and (24) as follows:

$$MmvdOffset1[0]=(MmvdDistance<<2)*(-MmvdSign[0]) \quad \text{Eq. (23)}$$

$$MmvdOffset1[1]=(MmvdDistance<<2)*(-MmvdSign[1]) \quad \text{Eq. (24)}$$

where MmvdDistance can be looked up from Table 3 with the MMVD distance index (e.g., merge_gpm_mmvd_distance_idx) as input, and MmvdSign can be looked up from Table 4 with the MMVD direction index (e.g., merge_gpm_mmvd_direction_idx) as input. Based on Equations (21)-(24), it can be shown that the second partition of the GPM can have a modified direction value (e.g., -MmvdSign) which is opposite to the direction value (e.g., MmvdSign) of the first partition of the GPM.

In yet another example, when merge_gpm_mmvd_enable_flag is true, a MMVD position index can be signaled to indicate a combination of the direction and distance information of the two partitions of GPM. Accordingly, the offset value of the MMVD for the first partition of the GPM and the offset value of the MMVD for the second partition of the GPM can be determined based on the distance information and the direction information. The possible combinations of the direction and distance information of the two partitions of GPM can be signaled based on a fixed order. In addition, the combinations that can lead to same final MVs of the two partitions of the GPM can be removed at the CU level. Further, the position index can be signaled with a variable-length coding.

Figure 11:
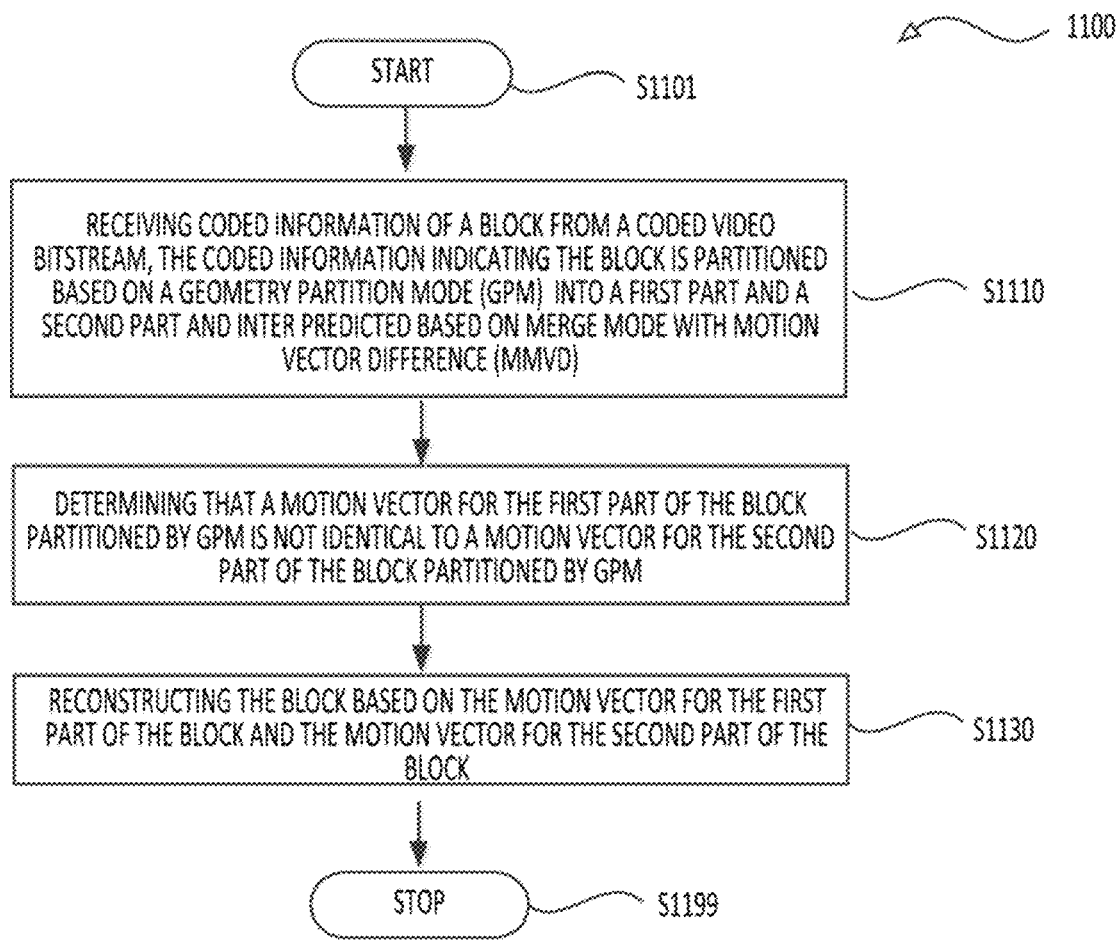
FIG. 11 shows a first flow chart outlining a decoding process example according to some embodiments of the disclosure.
Figure 12:
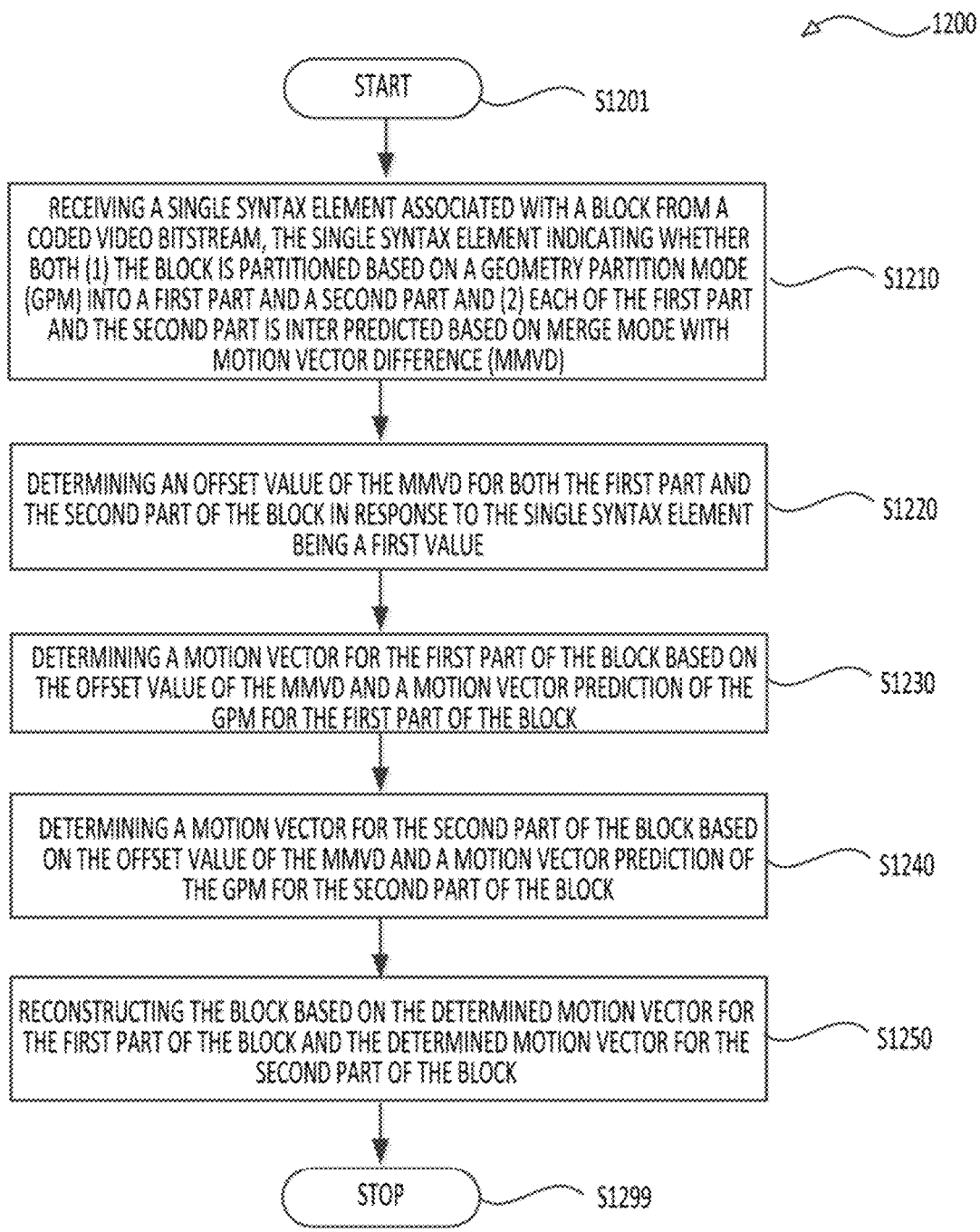
FIG. 12 shows a second flow chart outlining a decoding process example according to some embodiments of the disclosure.
Figure 13:
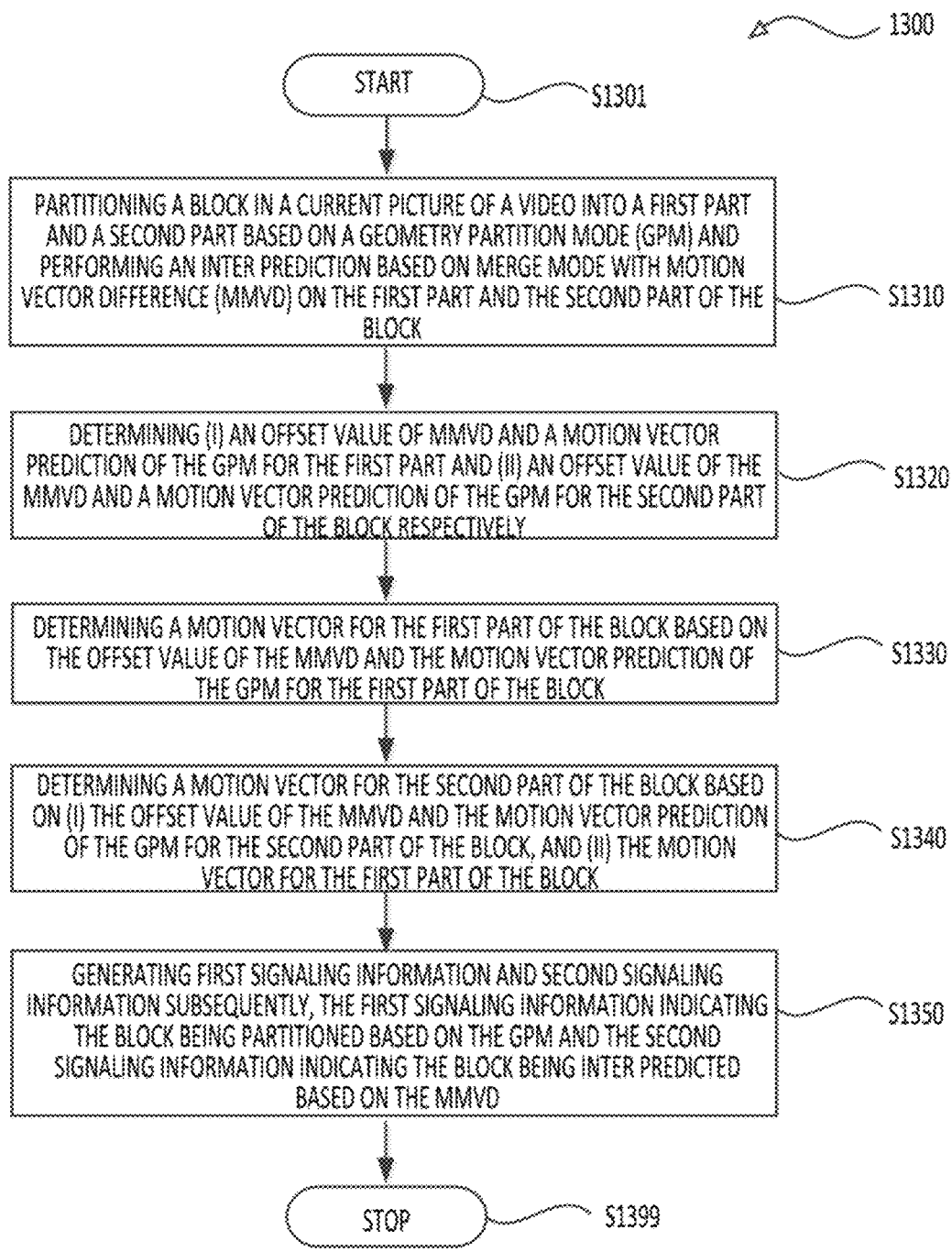
FIG. 13 shows a first flow chart outlining an encoding process example according to some embodiments of the disclosure.
Figure 14:
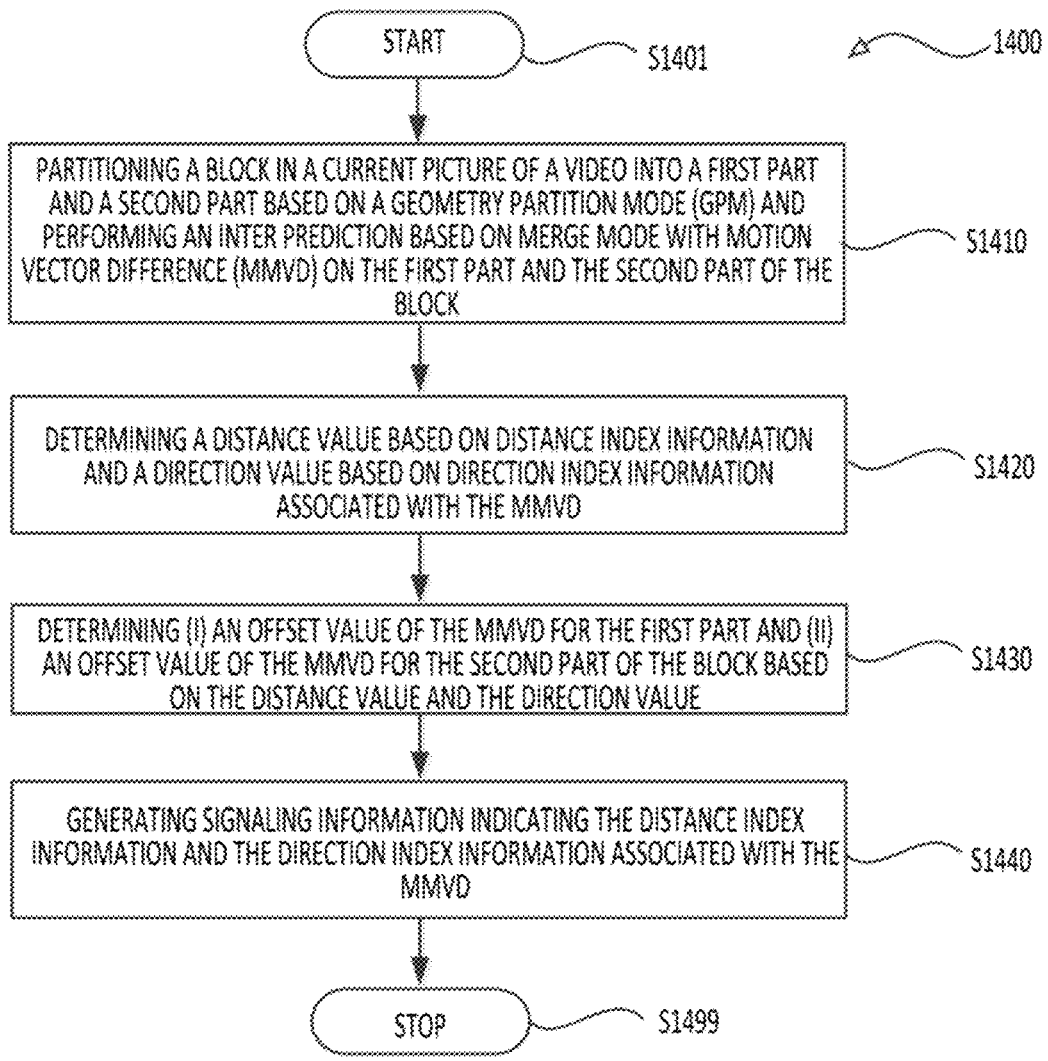
FIG. 14 shows a second flow chart outlining an encoding process example according to some embodiments of the disclosure.

FIG. 11 shows a first flow chart outlining an exemplary decoding process (1100) according to some embodiments of the disclosure. FIG. 12 shows a second flow chart outlining an exemplary decoding process (1200) according to some embodiments of the disclosure. FIG. 13 shows a first flow chart outlining an exemplary encoding process (1300) according to some embodiments of the disclosure. FIG. 14 shows a second flow chart outlining an exemplary decoding process (1400) according to some embodiments of the disclosure. The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

In embodiments, any operations of processes (e.g., 1100, 1200, 1300, and 1400) may be combined or arranged in any amount or order, as desired. In embodiments, two or more of the operations of the processes (e.g., 1100, 1200, 1300, and 1400) may be performed in parallel.

The processes (e.g., 1100, 1200, 1300, and 1400) can be used in the reconstruction of a block, so as to generate a prediction block for the block under reconstruction. In various embodiments, the processes (e.g., 1100, 1200, 1300, and 1400) are executed by processing circuitry, such as the processing circuitry in the terminal devices (210), (220), (230) and (240), the processing circuitry that performs functions of the video encoder (303), the processing circuitry that performs functions of the video decoder (310), the processing circuitry that performs functions of the video decoder (410), the processing circuitry that performs functions of the video encoder (503), and the like. In some embodiments, the processes (e.g., 1100, 1200, 1300, and 1400) are implemented in software instructions, thus when the processing circuitry executes the software instructions, the processing circuitry performs the processes (e.g., 1100, 1200, 1300, and 1400).

As shown in FIG. 11, the process (1100) can start from (S1110). At (S1110), coded information of a block can be received from a coded video bitstream. The coded information can indicate that the block is partitioned based on a GPM into a first part and a second part and inter predicted based on MMVD. The GPM can include a plurality of angle indexes and a plurality of edge indexes. The plurality of angle indexes can indicate angles and the plurality of edge indexes can indicate edge positions that are relative to a center of the block. The MMVD can include a plurality of distance indexes and a plurality of direction indexes. The plurality of distance indexes can indicate distances and the plurality of direction indexes can indicate directions with respect to a starting motion vector.

The process (1100) can then proceed to (S1120). At (S1120), that a motion vector for the first part of the block partitioned by GPM is not identical to a motion vector for the second part of the block partitioned by GPM can be determined.

At (S1130), the block can be reconstructed based on the motion vector for the first part of the block and the motion vector for the second part of the block.

In the process (1100), (i) an offset value of the MMVD and a motion vector prediction of the GPM for the first part and (ii) an offset value of the MMVD and a motion vector prediction of the GPM for the second part of the block can be determined. The motion vector for the first part of the block can be determined based on the offset value of the MMVD and the motion vector prediction of the GPM for the first part of the block. The motion vector for the second part of the block can be determined based on (i) the offset value of the MMVD and the motion vector prediction of the GPM for the second part of the block, and (ii) the motion vector for the first part of the block.

In the process (1100), to determine the offset value of the MMVD for the first part and the offset value of the MMVD for the second part, the offset value of the MMVD for the first part of the block can be determined based on a product of a first distance value and a first direction value. The offset value of the MMVD for the second part of the block can be determined based on a product of a second distance value and a second direction value. The first distance value can be obtained based on first distance index information. The first direction value can be obtained based on first direction index information. The second distance value can be obtained based on second distance index information and the motion vector of the first part of the block. The second direction value can be obtained based on second direction index information.

In some embodiments, the motion vector for the second part of the block can be determined to be equal to a sum of the offset value of the MMVD for the second part of the block and the motion vector prediction of the GPM for the second part of the block, in response to the sum of the offset value of the MMVD for the second part of the block and the motion vector prediction of the GPM for the second part of the block being not equal to the motion vector for the first part of the block.

In some embodiments, to determine the motion vector for the second part of the block, in response to a sum of the offset value of the MMVD for the second part of the block and the motion vector prediction of the GPM for the second part of the block being equal to the motion vector for the first part of the block, a modified offset value of the MMVD can be determined based on a product of a modified second distance value and the second direction value for the second part of the block, where the modified second distance value can be obtained based on the second distance index information plus one. The motion vector for the second part of the block can subsequently be determined to be equal to a sum of the modified offset value of the MMVD for the second part of the block and the motion vector prediction of the GPM for the second part of the block.

In some embodiments, in accordance with a conformance requirement, the motion vector for the first part of the block partitioned by GPM may not be identical to the motion vector for the second part of the block partitioned by GPM.

As shown in FIG. 12, the process (1200) can start from (S1210). At (S1210), a single syntax element associated with a block can be received from a coded video bitstream, where the single syntax element can indicate whether both (i) the block is partitioned based on a GPM into a first part and a second part and (2) each of the first part and the second part is inter predicted based on MMVD. The GPM can include a plurality of angle indexes and a plurality of edge indexes. The plurality of angle indexes can indicate angles and the plurality of edge indexes can indicate edge positions that are relative to a center of the block. The MMVD can include a plurality of distance indexes and a plurality of direction indexes. The plurality of distance indexes can indicate distances and the plurality of direction indexes can indicate directions with respect to a starting motion vector.

At (S1220), an offset value of the MMVD for both the first part and the second part of the block can be determined in response to the single syntax element being a first value.

At (S1230), a motion vector can be determined for the first part of the block based on the offset value of the MMVD and a motion vector prediction of the GPM for the first part of the block.

At (S1240), a motion vector can be determined for the second part of the block based on the offset value of the MMVD and a motion vector prediction of the GPM for the second part of the block.

The process (1200) can then proceed to (S1250), where the block can be reconstructed based on the determined motion vector for the first part of the block and the determined motion vector for the second part of the block.

In some embodiments, to determine the offset value of the MMVD for both the first part and the second part of the block in response to the single syntax element being the first value, distance index information and direction index information associated with the MMVD can be received. A distance value can be determined based on the distance index information and a direction value can be determined based on the direction index information. The offset value of the MMVD for the first part of the block and the offset value of the MMVD for the second part of the block can be determined to be equal to a product of the distance value and the direction value.

In some embodiments, to determine the offset value of the MMVD for both the first part and the second part of the block in response to the single syntax element being the first value, distance index information and direction index information associated with the MMVD can be received. A distance value can be determined based on the distance index information and a direction value can be determined based on the direction index information. The offset value of the MMVD for the first part of the block can be determined based on a product of the distance value and the direction value. The offset value of the MMVD for the second part of the block can be determined based on a product of the distance value and a modified direction value, where the modified direction value can be opposite to the direction value.

In some embodiments, to determine the offset value of the MMVD for both the first part and the second part of the block in response to the single syntax element being the first value, position index information associated with the MMVD can be received from the coded video bitstream. The position index information can indicate a combination of distance information and direction information associated with the MMVD for the first part and the second part of the block. The offset value of the MMVD for the first part of the block and the offset value of the MMVD for the second part of the block can be determined based on the distance information and the direction information.

In some embodiments, the position index information can be coded based on a variable-length coding.

As shown in FIG. 13, the process (1300) can start from (S1310). At (S1310), a block in a current picture of a video can be partitioned into a first part and a second part based on a GPM and an inter prediction can be performed based on MMVD on the first part and the second part of the block. The GPM can include a plurality of angle indexes and a plurality of edge indexes relative to a center of the block. The MMVD can include a plurality of distance indexes and a plurality of direction indexes with respect to a starting motion vector.

At (S1320), an offset value of MMVD and a motion vector prediction of the GPM for the first part can be determined. In addition, an offset value of the MMVD and a motion vector prediction of the GPM for the second part of the block can be determined.

At (S1330), a motion vector for the first part of the block can be determined based on the offset value of the MMVD and the motion vector prediction of the GPM for the first part of the block.

At (S1340), a motion vector for the second part of the block can be determined based on (i) the offset value of the MMVD and the motion vector prediction of the GPM for the second part of the block, and (ii) the motion vector for the first part of the block.

At (S1350), first signaling information and second signaling information can be generated subsequently. The first signaling information can indicate the block being partitioned based on the GPM and the second signaling information can indicate the block being inter predicted based on the MMVD.

As shown in FIG. 14, the process (1400) can start from (S1410). A block in a current picture of a video can be partitioned into a first part and a second part based on a GPM and an inter prediction can be performed based on merge mode with MMVD on the first part and the second part of the block. The GPM can include a plurality of angle indexes and a plurality of edge indexes relative to a center of the block. The MMVD can include a plurality of distance indexes and a plurality of direction indexes with respect to a starting motion vector.

At (S1420), a distance value can be determined based on distance index information and a direction value based on direction index information associated with the MMVD.

At (S1430), an offset value of the MMVD can be determined for the first part, and an offset value of the MMVD can be determined for the second part of the block based on the distance value and the direction value.

At (S1440), signaling information can be generated to indicate the distance index information and the direction index information associated with the MMVD.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
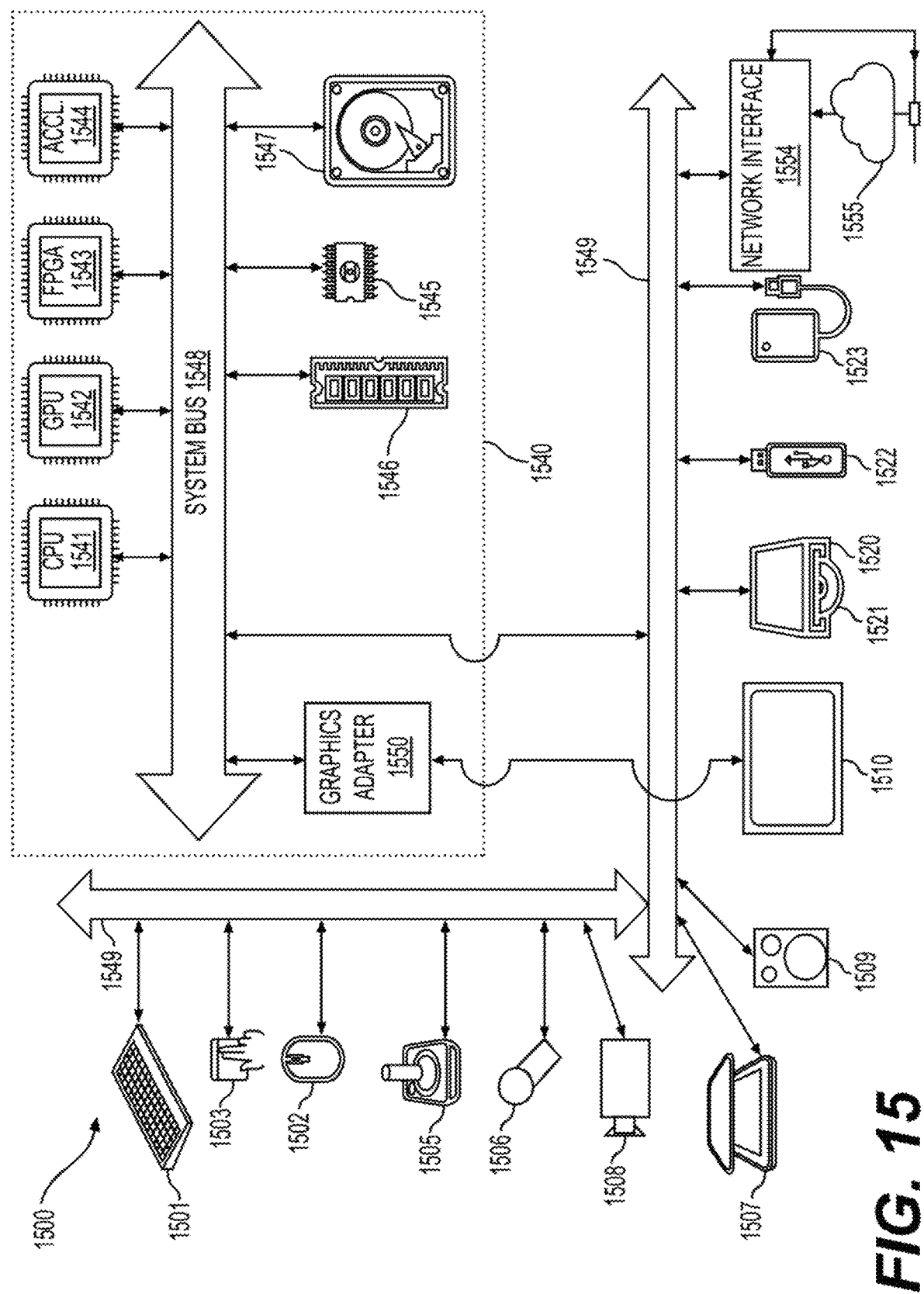
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface (1554) to one or more communication networks (1555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), graphics adapters (1550), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). In an example, the screen (1510) can be connected to the graphics adapter (1550). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of decoding performed in a decoder, the method comprising:
    receiving coded information of a block from a coded video bitstream, the coded information indicating that the block is partitioned based on a geometry partition mode (GPM) into a first part and a second part and inter predicted based on merge mode with motion vector difference (MMVD), the GPM including a plurality of angle indexes and a plurality of edge indexes, the plurality of angle indexes indicating angles and the plurality of edge indexes indicating edge positions that are relative to a center of the block, the MMVD including a plurality of distance indexes and a plurality of direction indexes, the plurality of distance indexes indicating distances and the plurality of direction indexes indicating directions with respect to a starting motion vector;
    determining whether a first motion vector for the first part of the block partitioned by GPM is identical to a second motion vector for the second part of the block partitioned by GPM based on a first distance index of the plurality of distance indexes and a first direction index of the plurality direction indexes associated with the first part of the block and a second distance index of the plurality of distance indexes and a second direction index of the plurality direction indexes associated with the second part of the block;
    reconstructing the block based on the first motion vector for the first part of the block and the second motion vector for the second part of the block when the first motion vector for the first part of the block partitioned by GPM is determined as not identical to the second motion vector for the second part of the block partitioned by GPM; and
    reconstructing the block based on the first motion vector for the first part of the block and a third motion vector for the second part of the block when the first motion vector for the first part of the block partitioned by GPM is determined as identical to the second motion vector for the second part of the block partitioned by GPM, the third motion vector for the second part of the block being determined based on the second distance index incremented by 1 and the second direction index.

2. The method of claim 1, further comprising:
    determining (i) an offset value of the MMVD and a motion vector prediction of the GPM for the first part and (ii) an offset value of the MMVD and a motion vector prediction of the GPM for the second part of the block;
    determining the first motion vector for the first part of the block based on the offset value of the MMVD and the motion vector prediction of the GPM for the first part of the block; and
    determining the second motion vector for the second part of the block based on the offset value of the MMVD and the motion vector prediction of the GPM for the second part of the block, the offset value of the MMVD for the second part of the block being determined based on the first motion vector for the first part of the block.

3. The method of claim 2, wherein the determining the offset value of the MMVD for the first part and the offset value of the MMVD for the second part further comprises:
    determining the offset value of the MMVD for the first part of the block based on a product of a first distance value and a first direction value; and
    determining the offset value of the MMVD for the second part of the block based on a product of a second distance value and a second direction value, wherein:
    the first distance value is obtained based on the first distance index,
    the first direction value is obtained based on the first direction index,
    the second distance value is obtained based on the second distance index and the first motion vector of the first part of the block, and
    the second direction value is obtained based on the second direction index.

4. The method of claim 3, wherein the determining the second motion vector for the second part of the block further comprises:
    determining the second motion vector for the second part of the block to be equal to a sum of the offset value of the MMVD for the second part of the block and the motion vector prediction of the GPM for the second part of the block when the sum of the offset value of the MMVD for the second part of the block and the motion vector prediction of the GPM for the second part of the block is not equal to the first motion vector for the first part of the block.

5. The method of claim 3, comprising:
    when a sum of the offset value of the MMVD for the second part of the block and the motion vector prediction of the GPM for the second part of the block being is equal to the first motion vector for the first part of the block, determining a modified offset value of the MMVD based on a product of a modified second distance value and the second direction value for the second part of the block, the modified second distance value being obtained based on the second distance index plus one; and determining the third motion vector for the second part of the block to be equal to a sum of the modified offset value of the MMVD for the second part of the block and the motion vector prediction of the GPM for the second part of the block.

6. A method of video decoding performed in a video decoder, the method comprising:

receiving a single syntax element associated with a block from a coded video bitstream, the single syntax element indicating whether both (1) the block is partitioned based on a geometry partition mode (GPM) into a first part and a second part and (2) each of the first part and the second part is inter predicted based on merge mode with motion vector difference (MMVD), the GPM including a plurality of angle indexes and a plurality of edge indexes, the plurality of angle indexes indicating angles and the plurality of edge indexes indicating edge positions that are relative to a center of the block, the MMVD including a plurality of distance indexes and a plurality of direction indexes, the plurality of distance indexes indicating distances and the plurality of direction indexes indicating directions with respect to a starting motion vector;

determining a same offset value of the MMVD for both the first part and the second part of the block when the single syntax element is a first value, the offset value of the MMVD for both the first part and the second part of the block being indicated by a distance index of the plurality of distance indexes and a direction index of the plurality of direction indexes associated with the MMVD;

determining a motion vector for the first part of the block based on the offset value of the MMVD and a motion vector prediction of the GPM for the first part of the block;

determining a motion vector for the second part of the block based on the offset value of the MMVD and a motion vector prediction of the GPM for the second part of the block; and reconstructing the block based on the determined motion vector for the first part of the block and the determined motion vector for the second part of the block.

7. The method of claim 6, wherein the determining the offset value of the MMVD for both the first part and the second part of the block when the single syntax element is the first value further comprises:

receiving distance index information indicating the distance index and direction index information indicating the direction index associated with the MMVD;

determining a distance value based on the distance index information and a direction value based on the direction index information; and determining the offset value of the MMVD for the first part of the block and the offset value of the MMVD for the second part of the block based on a product of the distance value and the direction value.

8. The method of claim 6, wherein the determining the offset value of the MMVD for both the first part and the second part of the block when the single syntax element is the first value further comprises:

receiving distance index information indicating the distance index and direction index information indicating the direction index associated with the MMVD;

determining a distance value based on the distance index information and a direction value based on the direction index information;

determining the offset value of the MMVD for the first part of the block based on a product of the distance value and the direction value; and determining the offset value of the MMVD for the second part of the block based on a product of the distance value and a modified direction value, the modified direction value being opposite to the direction value.

9. The method of claim 6, wherein the determining the offset value of the MMVD for both the first part and the second part of the block when the single syntax element is the first value further comprises:

receiving position index information associated with the MMVD from the coded video bitstream, the position index information indicating a combination of distance information and direction information associated with the MMVD for the first part and the second part of the block, the distance index and the direction index being a position index indicated by the position index information; and determining the offset value of the MMVD for the first part of the block and the offset value of the MMVD for the second part of the block based on the distance information and the direction information.

10. The method of claim 9, wherein the position index information is coded based on a variable-length coding.

11. An apparatus for video decoding, comprising:
processing circuitry configured to:

receive coded information of a block from a coded video bitstream, the coded information indicating the block is partitioned based on a geometry partition mode (GPM) into a first part and a second part and inter predicted based on merge mode with motion vector difference (MMVD), the GPM including a plurality of angle indexes and a plurality of edge indexes, the plurality of angle indexes indicating angles and the plurality of edge indexes indicating edge positions that are relative to a center of the block, the MMVD including a plurality of distance indexes and a plurality of direction indexes, the plurality of distance indexes indicating distances and the plurality of direction indexes indicating directions with respect to a starting motion vector;

determine whether a first motion vector for the first part of the block partitioned by GPM is not identical to a second motion vector for the second part of the block partitioned by GPM based on a first distance index of the plurality of distance indexes and a first direction index of the plurality direction indexes associated with the first part of the block and a second distance index of the plurality of distance indexes and a second direction index of the plurality direction indexes associated with the second part of the block;

reconstruct the block based on the first motion vector for the first part of the block and the second motion vector for the second part of the block when the first motion vector for the first part of the block partitioned by GPM is determined as not identical to the second motion vector for the second part of the block partitioned by GPM; and reconstruct the block based on the first motion vector for the first part of the block and a third motion vector for the second part of the block when the first motion vector for the first part of the block partitioned by GPM is determined as identical to the second motion vector for the second part of the block partitioned by GPM, the third motion vector for the second part of the block being determined based on the second distance index incremented by 1 and the second direction index.

12. The apparatus of claim 11, wherein the processing circuitry is configured to:
  determine (i) an offset value of the MMVD and a motion vector prediction of the GPM for the first part and (ii) an offset value of the MMVD and a motion vector prediction of the GPM for the second part of the block;
  determine the first motion vector for the first part of the block based on the offset value of the MMVD and the motion vector prediction of the GPM for the first part of the block;
  determine the second motion vector for the second part of the block based on the offset value of the MMVD and the motion vector prediction of the GPM for the second part of the block, the offset value of the MMVD for the second part of the block being determined based on the first motion vector for the first part of the block.

13. The apparatus of claim 12, wherein the processing circuitry is configured to:
  determine the offset value of the MMVD for the first part of the block based on a product of a first distance value and a first direction value; and
  determine the offset value of the MMVD for the second part of the block based on a product of a second distance value and a second direction value, wherein:
  the first distance value is obtained based on the first distance index,
  the first direction value is obtained based on the first direction index,
  the second distance value is obtained based on the second distance index and the first motion vector of the first part of the block, and
  the second direction value is obtained based on the second direction index.

14. The apparatus of claim 13, wherein the processing circuitry is configured to:
  determine the second motion vector for the second part of the block to be equal to a sum of the offset value of the MMVD for the second part of the block and the motion vector prediction of the GPM for the second part of the block when the sum of the offset value of the MMVD for the second part of the block and the motion vector prediction of the GPM for the second part of the block is not equal to the first motion vector for the first part of the block.

15. The apparatus of claim 13, wherein the processing circuitry is configured to:
  when a sum of the offset value of the MMVD for the second part of the block and the motion vector prediction of the GPM for the second part of the block is equal to the first motion vector for the first part of the block,
  determine a modified offset value of the MMVD based on a product of a modified second distance value and the second direction value for the second part of the block, the modified second distance value being obtained based on the second distance index plus one; and
  determine the third motion vector for the second part of the block to be equal to a sum of the modified offset value of the MMVD for the second part of the block and the motion vector prediction of the GPM for the second part of the block.

16. An apparatus for video decoding, comprising:
processing circuitry configured to:
  receive a single syntax element associated with a block from a coded video bitstream, the single syntax element indicating whether both (1) the block is partitioned based on a geometry partition mode (GPM) into a first part and a second part and (2) each of the first part and the second part is inter predicted based on merge mode with motion vector difference (MMVD), the GPM including a plurality of angle indexes and a plurality of edge indexes, the plurality of angle indexes indicating angles and the plurality of edge indexes indicating edge positions that are relative to a center of the block, the MMVD including a plurality of distance indexes and a plurality of direction indexes, the plurality of distance indexes indicating distances and the plurality of direction indexes indicating directions with respect to a starting motion vector;
  determine a same offset value of the MMVD for both the first part and the second part of the block when the single syntax element is a first value, the offset value of the MMVD for both the first part and the second part of the block being indicated by a distance index of the plurality of distance indexes and a direction index of the plurality of direction indexes associated with the MMVD;
  determine a motion vector for the first part of the block based on the offset value of the MMVD and a motion vector prediction of the GPM for the first part of the block;
  determine a motion vector for the second part of the block based on the offset value of the MMVD and a motion vector prediction of the GPM for the second part of the block; and
  reconstruct the block based on the determined motion vector for the first part of the block and the determined motion vector for the second part of the block.

17. The apparatus of claim 16, wherein, when the single syntax element is the first value, the processing circuitry is configured to:
  receive distance index information indicating the distance index and direction index information indicating the direction index associated with the MMVD;
  determine a distance value based on the distance index information and a direction value based on the direction index information; and
  determine the offset value of the MMVD for the first part of the block and the offset value of the MMVD for the second part of the block based on a product of the distance value and the direction value.

18. The apparatus of claim 16, wherein, when the single syntax element is the first value, the processing circuitry is configured to:
  receive distance index information indicating the distance index and direction index information indicating the direction index associated with the MMVD;
  determine a distance value based on the distance index information and a direction value based on the direction index information;
  determine the offset value of the MMVD for the first part of the block based on a product of the distance value and the direction value; and
  determine the offset value of the MMVD for the second part of the block based on a product of the distance value and a modified direction value, the modified direction value being opposite to the direction value.

19. The apparatus of claim 16, wherein, when the single syntax element is the first value, the processing circuitry is configured to:
  receive position index information associated with the MMVD from the coded video bitstream, the position index information indicating a combination of distance information and direction information associated with the MMVD for the first part and the second part of the block, the distance index and the direction index being a position index indicated by the position index information; and
  determine the offset value of the MMVD for the first part of the block and the offset value of the MMVD for the second part of the block based on the distance information and the direction information.

20. The apparatus of claim 19, wherein the position index information is coded based on a variable-length coding.

* * * * *